United States Patent [19]
Kane et al.

[11] Patent Number: 5,596,739
[45] Date of Patent: Jan. 21, 1997

[54] METHOD AND APPARATUS FOR DETECTING MEMORY SEGMENT VIOLATIONS IN A MICROPROCESSOR-BASED SYSTEM

[75] Inventors: James A. Kane, Newport Beach; Hsiao-Shih Chang, Orange; Graham B. Whitted, III, Irvine, all of Calif.

[73] Assignee: Meridian Semiconductor, inc., Irvine, Calif.

[21] Appl. No.: 193,388

[22] Filed: Feb. 8, 1994

[51] Int. Cl.⁶ .................................................. G06F 12/14
[52] U.S. Cl. ........................ 395/479; 395/490; 395/480; 395/186; 395/187.01; 364/DIG. 1
[58] Field of Search ................................. 395/425, 800, 395/400, 490, 186, 188.01, 187.01, 480, 479; 326/8; 364/DIG. 1

[56] References Cited

U.S. PATENT DOCUMENTS

| | | | |
|---|---|---|---|
| 3,916,385 | 10/1975 | Parmar et al. | 395/436 |
| 4,177,510 | 12/1979 | Appell et al. | 395/490 |
| 4,442,484 | 4/1984 | Childs, Jr. et al. | 395/490 |
| 4,787,031 | 11/1988 | Karger et al. | 395/800 |
| 4,949,238 | 8/1990 | Kamiya | 395/491 |
| 4,972,338 | 11/1990 | Crawford et al. | 395/416 |
| 4,979,098 | 12/1990 | Baum et al. | 395/418 |
| 5,023,773 | 6/1991 | Baum et al. | 395/727 |
| 5,144,551 | 9/1992 | Cepulis | 395/490 |
| 5,317,717 | 5/1994 | Cutler et al. | 395/490 |
| 5,396,609 | 3/1995 | Schmidt et al. | 395/490 |

OTHER PUBLICATIONS

Intel i486™ Processor Programmer's Reference Manual, Intel Corporation, 1990; Chapter 6, pp. 6-1 through 6-25.

*Primary Examiner*—Tod R. Swann
*Assistant Examiner*—James Peikari
*Attorney, Agent, or Firm*—Knobbe, Martens, Olson & Bear

[57] ABSTRACT

A protection mechanism for a microprocessor has multiple privilege levels for tasks running on the microprocessor. A memory control unit for the microprocessor includes segment registers that identify segments of memory assigned to various tasks. When a segment register is loaded with the address of a new segment for a task, the protection mechanism within the memory control unit compares the privilege level of the task requesting the segment with the privilege level of the requested memory segment and determines whether the requested memory segment can be assigned to the requesting task. The relationship between the privilege levels is programmable to provide flexibility in generating privilege faults.

13 Claims, 14 Drawing Sheets

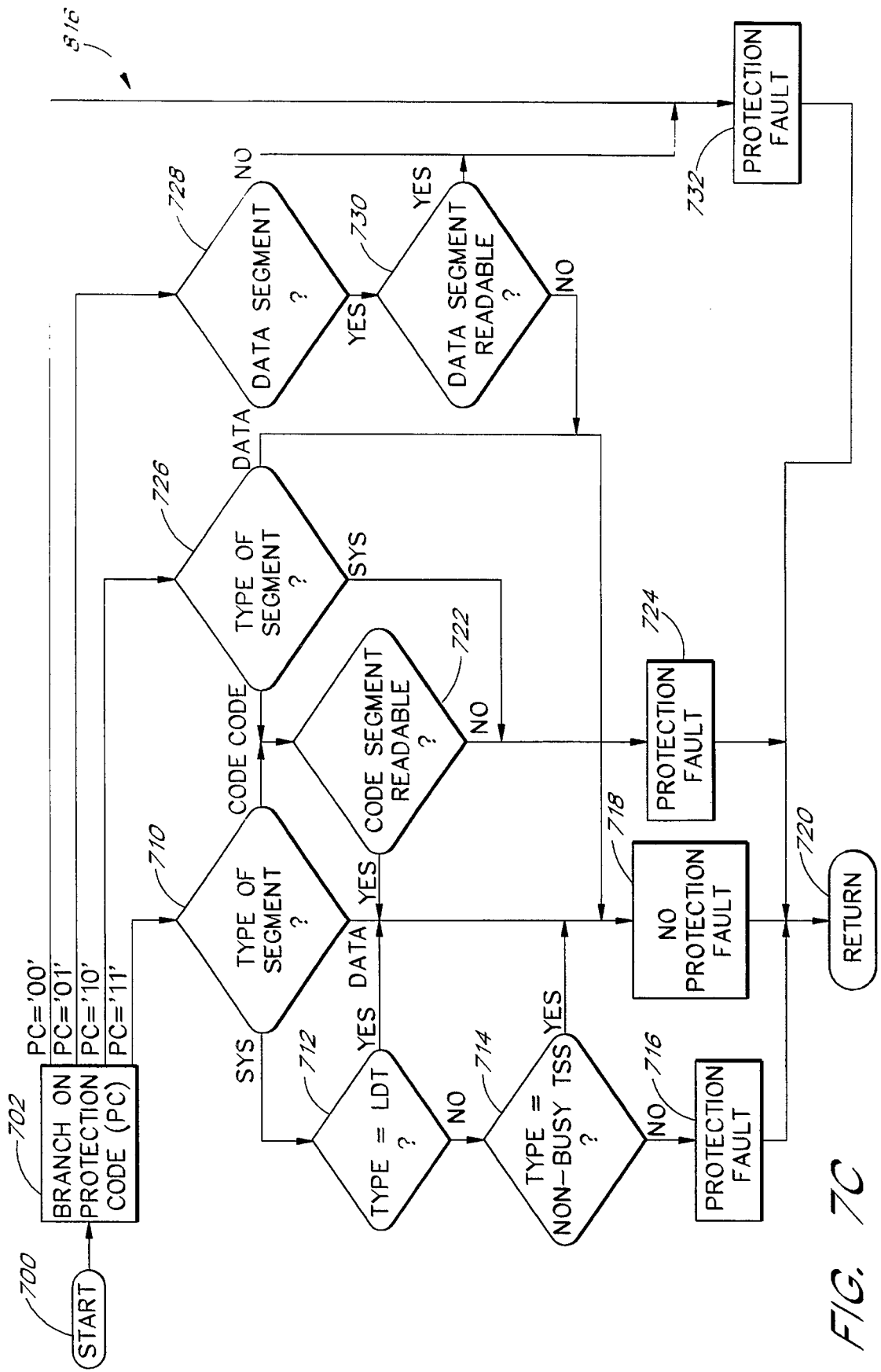

METHOD AND APPARATUS FOR DETECTING MEMORY SEGMENT VIOLATIONS IN A MICROPROCESSOR-BASED SYSTEM

BACKGROUND OF THE INVENTION

1. Field of the Invention

The present invention is in the field of memory protection mechanisms for preventing or allowing access to different areas of memory based on a privilege level assigned to the software routine initiating the access.

2. Background Information

Modern computer systems generally have numerous software programs and routines that perform various functions. More specifically, a computer system typically has an operating system, a number of drivers and a number of application programs. Typically, the different routines in a computer system share a variety of resources, such as memory and I/O drivers. The sharing of resources leads to possible interference between different routines. For example, a first routine may write data into a memory area that contains the data of a second routine, which may cause problems for the second routine when it begins or resumes execution. This type of problem may become particularly troublesome in a multi-tasking environment.

Some computer systems implement a memory protection mechanism to reduce interference between different software routines. A memory protection mechanism typically restricts access to selected areas of memory to certain privileged software routines. Memory protection mechanisms provide other benefits, as well. For example, such a mechanism may protect diagnostic information when a software routine crashes, facilitating debugging of the failing routine.

A generic 486 microprocessor has a protection mechanism involving four different privilege levels numbered zero through three, with zero representing the most privileged level and three representing the least privileged level. Each memory segment and each software routine is assigned a privilege level. The protection mechanism monitors memory accesses and implements rules related to those memory accesses. Generally, less privileged software routines are not allowed to access more privileged memory segments. Thus, for example, a software routine with a privilege level of 3 generally cannot access a memory segment with a privilege level of 2. It has been found that having a fixed relationship between the privilege levels and rigid rules regarding access rights reduces the flexibility of systems utilizing processors having protection mechanisms.

SUMMARY OF THE INVENTION

The present invention includes a memory control unit for a microprocessor that can run multiple tasks. The memory control unit has segment registers for directing memory access requests to specified segments in a memory associated with the memory control unit. The microprocessor further assigns privilege levels to the segments in the memory and assigns privilege levels to the multiple tasks. The memory control unit comprises a protection circuit that monitors privilege levels of tasks and privilege levels of the specified segments in the memory. The protection circuit verifies that a task requesting a specified memory segment is privileged to access the specified memory segment. The memory control unit further includes at least one programmable protection register accessible by the protection circuit. The programmable protection register is indexed by an index formed by combining a privilege level of the task requesting the specified memory segment and a privilege level of the specified memory segment. The protection register outputs at least one value responsive to the index that indicates whether the memory segment is accessible by the task. The protection circuit permits the memory control unit to load a segment register to identify the specified memory segment only when the specified memory segment is accessible by the task.

BRIEF DESCRIPTION OF THE DRAWINGS

FIG. 7C is a logical flow chart illustrating a preferred method for decoding protection codes that may be implemented at a process block 816 of FIG. 7B.

DETAILED DESCRIPTION OF THE PREFERRED EMBODIMENT

Figure 1:
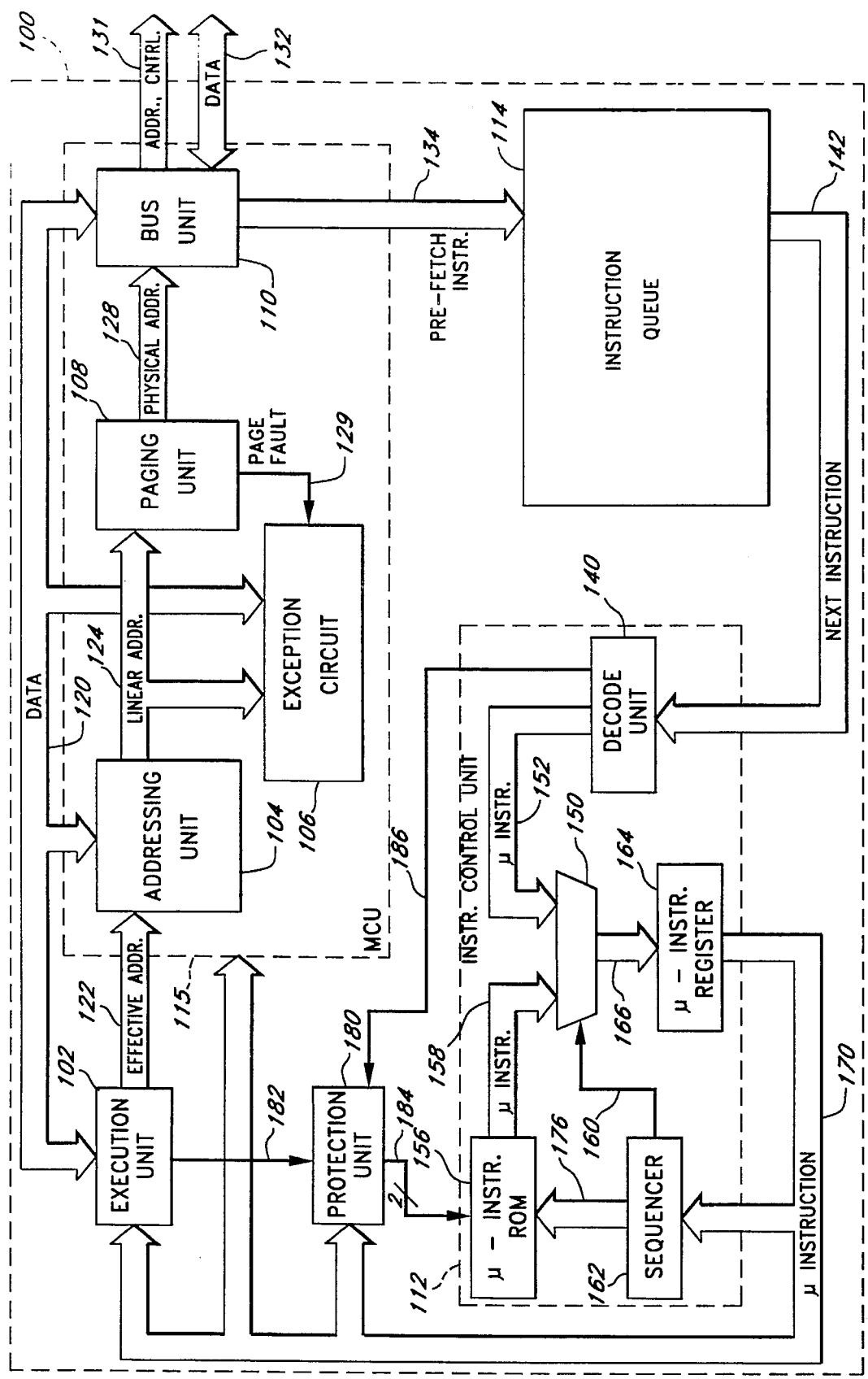
FIG. 1 is a functional block diagram of a microprocessor containing a memory protection mechanism of the present invention.

FIG. 1 is a high-level block diagram of a microprocessor 100, implementing a method of the present invention for detecting memory segment violations. The preferred embodiment of the present invention is described in terms of a generic 486 microprocessor. However, the present invention can also be implemented in a wide variety of other computer systems.

The microprocessor 100 comprises an execution unit 102, an instruction control unit 112, an instruction queue 114, a memory control unit (MCU) 115, and a memory protection unit 180. The MCU 115 comprises an addressing unit 104, an exception circuit 106, a paging unit 108 and a bus unit 110.

The execution unit 102 is connected to the addressing unit 104 by an effective address bus 122. The addressing unit 104 is connected to the exception circuit 106 and the paging unit 108 by a linear address bus 124. The paging unit 108 is connected to the exception circuit 106 by a page fault line 129. The paging unit 108 is connected to the bus unit 110 by a physical address bus 128. The bus unit 110 is connected to the exception circuit 106, the addressing unit 104, and the execution unit 102 by an internal data bus 120.

The bus unit 110 of the MCU 115 is connected to external devices (not shown) by an address/control bus 131 and a data bus 132. The bus unit 110 is connected to the instruction queue 114 by a pre-fetch instruction bus 134.

The instruction control unit 112 comprises a macro-instruction decode unit 140, a micro-instruction multiplexer 150, a micro-instruction ROM 156, a sequencer 162 and a micro-instruction register 164. The instruction queue 114 is connected to the decode unit 140 of the instruction control unit 112 by an instruction bus 142. The decode unit 140 is connected to the micro-instruction multiplexer 150 by a micro-instruction bus 152. The micro-instruction ROM 156 is also connected to the micro-instruction multiplexer 150 by a micro-instruction bus 158. The micro-instruction multiplexer 150 is connected to the micro-instruction register 164 by a micro-instruction bus 166. The sequencer 162 is connected to the micro-instruction ROM 156 by an address/control bus 176. The sequencer 162 is also connected to the micro-instruction multiplexer 150 by a selector line 160. The micro-instruction register 164 is connected to the sequencer 162, the protection unit 180, the execution unit 102, and the MCU 115 by a micro-instruction bus 170. The execution unit 102 is connected to the protection unit 180 by a set of control signals 182. The protection unit 180 is connected to the micro-instruction ROM 156 by a pair of protection fault lines 184.

Figure 2A:
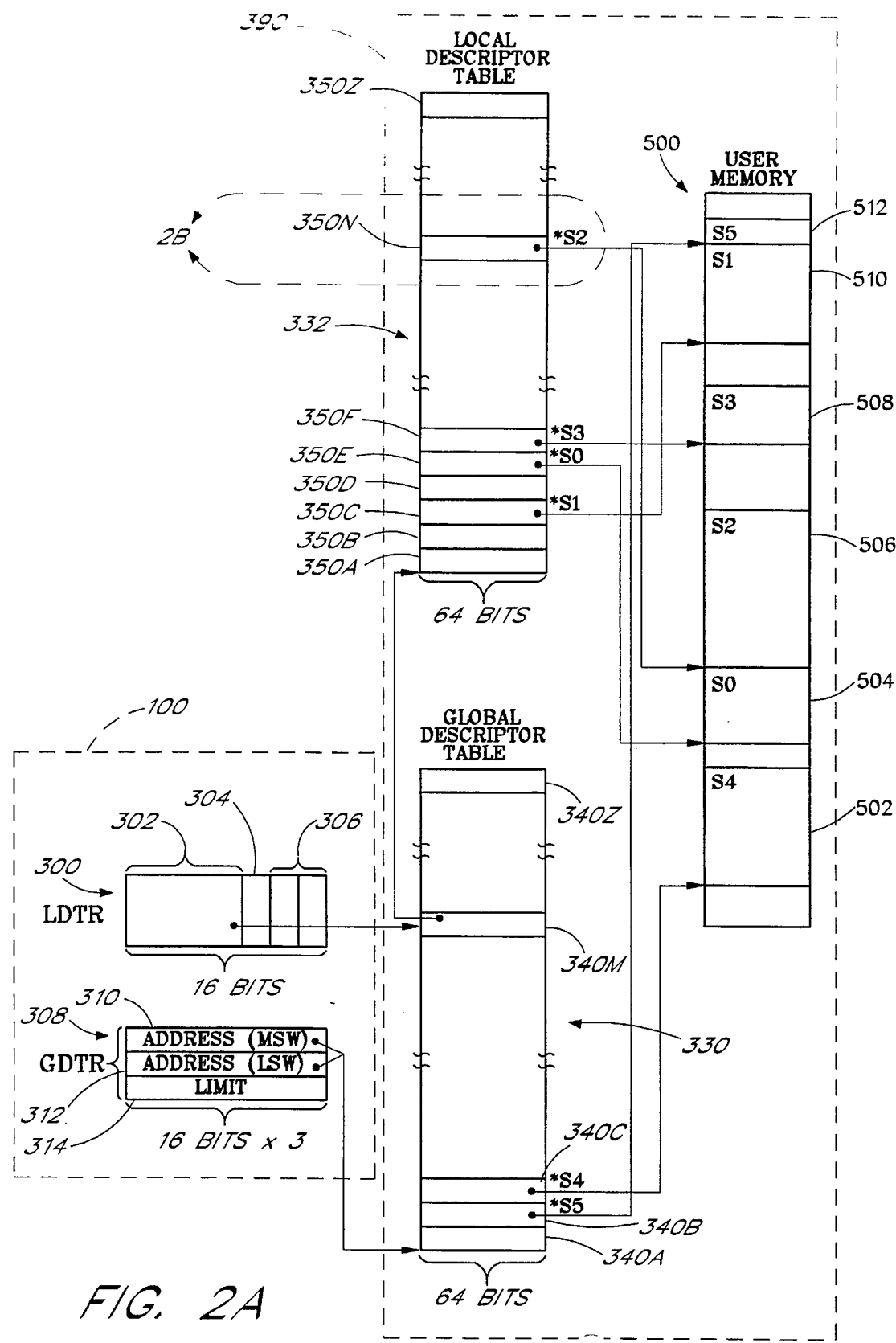
FIG. 2A is a functional diagram of an external memory comprising a segmented user memory and a set of descriptor tables for locating and identifying different memory segments, along with internal descriptor table registers for locating the descriptor tables.

The microprocessor 100 generally executes computer programs that are stored in an external memory 390, as shown in FIG. 2A. The bus unit 110 of the MCU 115 fetches macro-instructions from the external memory 390 using the address/control bus 131 and the data bus 132. The bus unit 110 provides these macro-instructions to the instruction queue 114 over the instruction bus 134. The instruction queue 114 provides the macro-instructions to the decode unit 140 of the instruction control unit 112, one at a time, over the instruction bus 142. As the bus unit 110 pre-fetches macro-instructions from the external memory 390, the instructions are stored in the instruction queue 114 until the decode unit 140 is ready for them.

The decode unit 140 generates micro-instructions that are communicated to a first input of the multiplexer 150 over the micro-instruction bus 152. The micro-instruction ROM 156 provides micro-instructions to a second input of the multiplexer 150 over the micro-instruction bus 158. The signal on the selector line 160 from the sequencer 162 controls the multiplexer 150 to select between the micro-instruction buses 152 and 158. The sequencer 162 also provides address and control data to the micro-instruction ROM 156 over the address/control bus 176 to select specific micro-instructions.

Micro-instructions selected by the multiplexer 150 are communicated to the micro-instruction register 164 over the micro-instruction bus 166. Micro-instructions held by the micro-instruction register 164 are applied to the micro-instruction bus 170. As is well known in the art, a micro-instruction comprises a number of fields that provide instruction data to different units within the microprocessor 100. As shown in FIG. 1, different fields of the micro-instruction are provided from the micro-instruction bus 170 to the sequencer 162, the protection unit 180, the MCU 115 and the execution unit 102. To simplify the diagram, micro-instruction paths to the addressing unit 104, the exception circuit 106, the paging unit 108 and the bus unit 110 of the MCU 115 are not shown.

For all macro-instructions, the first micro-instruction is generated by the decode unit 140, and subsequent micro-instructions, if any, are provided by the micro-instruction ROM 156. Thus, for the first micro-instruction, the sequencer 162 selects the micro-instruction bus 152, allowing the micro-instruction from the decode unit 140 to pass through the multiplexer 150 to the micro-instruction register 164. For macro-instructions requiring more than one micro-instruction, this first micro-instruction contains an address field specifying the address within the ROM 156 containing the second micro-instruction. This address field is provided to the sequencer 162 from the micro-instruction bus 170. For subsequent micro-instructions related to the macro-instruction, the sequencer 162 and the protection unit 180 select address locations within the ROM 156 using the address/control bus 176 and the protection fault lines 184, respectively. The sequencer 162 also controls the multiplexer 150 to select the micro-instruction bus 158 from the ROM 156. A preferred system for addressing the micro-instruction ROM 156 is described in greater detail below with reference to FIG. 9.

The execution unit 102 provides effective addresses to the addressing unit 104 of the MCU 115 over the address bus 122. Each effective address specifies a memory location for performing either an instruction fetch or an operand access. The effective address may be calculated from several different values. For example, the effective address may, under some circumstances, be calculated as the sum of a base offset value, a scaled index value and a displacement. The addressing unit 104 converts the effective addresses into linear addresses and provides the linear addresses to the exception circuit 106 and the paging unit 108 over the address bus 124. The linear address is generated by the addressing unit 104 according to the particular addressing scheme used by the microprocessor 100, if any. In the preferred embodiment, a memory segmentation addressing scheme is used, as described in greater detail below with reference to FIGS. 2A, 2B, 3A, 3B, 4 and 5. The paging unit 108 checks the linear address to determine whether or not the requested code or operand data is in memory. If the requested data is not in memory, the paging unit 108 asserts a page fault signal on the page fault line 129, indicating that a new page of data must be moved to memory. If the requested data is in memory, the paging unit 108 translates the linear address corresponding to an instruction fetch or operand access into a physical address uniquely identifying a particular memory location or range of memory locations.

The paging unit 108 applies the physical address to the address bus 128, which is connected to the bus unit 110. The bus unit 110 uses the physical address to perform the requested memory access using the address/control bus 131, and the data bus 132. The bus unit 110 may optionally include a cache (not shown). If the requested access is an operand read, the requested data is placed on the data bus 120. If the requested access is an instruction fetch, the bus unit 110 returns the requested code data on the macro-instruction bus 134, and the code data is buffered by the instruction queue 114. The exception circuit 106 reports various exception conditions, such as page faults, segment limit exceptions, breakpoint exceptions and memory read/write exceptions, to the instruction control unit 112, as is well known to one skilled in the art.

FIG. 2A illustrates the external memory 390 connected to the MCU 115 of the microprocessor 100. The external memory 390 comprises a global descriptor table 330, a local descriptor table 332, and a user memory 500. The global descriptor table 330 comprises a number of descriptor table entries 340A–340Z, including descriptors 340B, 340C, and 340M. In the preferred embodiment, the global descriptor table 330 may contain as many as 8,192 descriptors. The local descriptor table 332 also comprises a number of descriptors 350A–350Z, including descriptors 350B, 350C, 350D, 350E, 350F and 350N. In the preferred embodiment, the local descriptor table 332 may contain as many as 8,192 descriptors. The user memory 500 comprises a number of memory segments S4 502, S0 504, S2 506, S3 508, S1 510 and S5 512. These memory segments 502, 504, 506, 508, 510 and 512 may be code segments, data segments or system segments.

FIG. 2A also illustrates a local descriptor table register (LDTR) 300 and a global descriptor table register (GDTR) 308, within the microprocessor 100. The LDTR 300 comprises a 13-bit index 302, a single-bit table indicator 304, and a 2-bit privilege level 306. The GDTR 308 comprises a most significant address word 310, a least significant address word 312, and a limit word 314.

The most significant address word 310 and the least significant address word 312 of the GDTR 308 together comprise a 32-bit address which indicates the beginning of the global descriptor table 330 within the external memory 390. The GDTR 308 also contains a limit word 314 indicating the address offset between the beginning and the end of the global descriptor table 330.

The index 302 of the LDTR 300 identifies a particular descriptor 340A–340Z within the global descriptor table 330. If the index 302 equals zero, the descriptor 340A is identified; if the index 302 equals one, the descriptor 340B is identified; and so on. In FIG. 2A, the LDTR 300 is shown identifying the descriptor 340M. The descriptor 340M identifies the location, size and other characteristics of the local descriptor table 332. A 32-bit base address (analogous to the base address 352N of FIG. 2B) within the descriptor 340M indicates the address location of the local descriptor table 332 within the external memory 390. The segment limit (analogous to the segment limit 366N of FIG. 2B) within the descriptor 340M indicates the address offset between the beginning and the end of the local descriptor table 332.

Figure 2B:
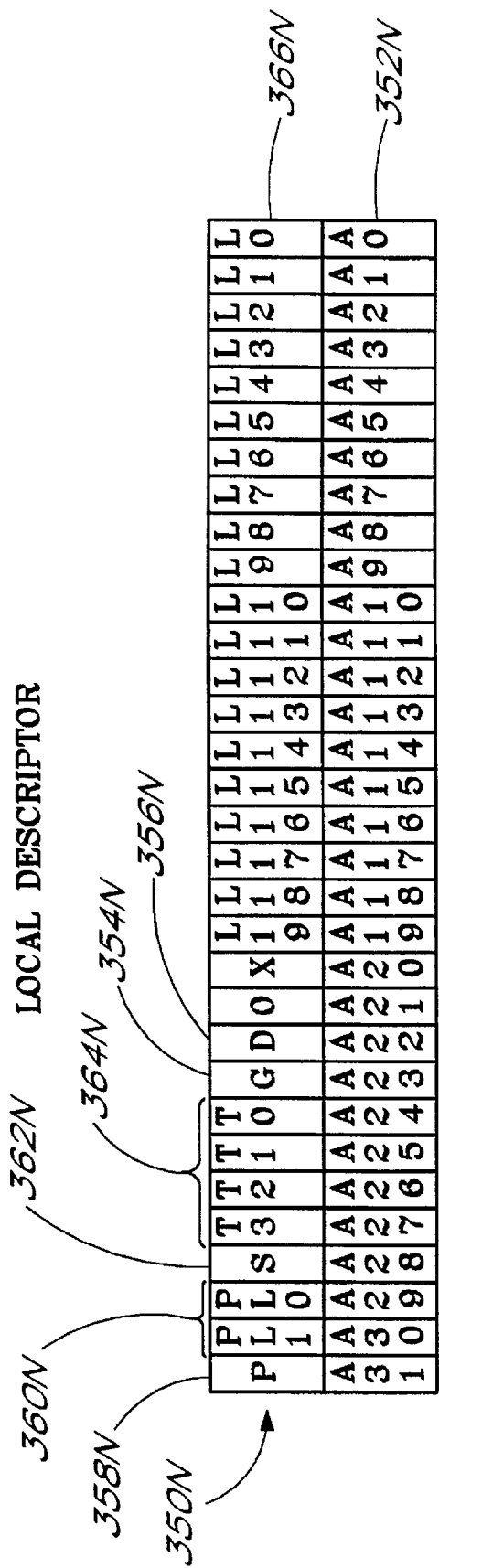
FIG. 2B is a bit definition diagram of a descriptor table entry.

FIG. 2B illustrates a bit definition diagram of a descriptor. Specifically, FIG. 2B illustrates the format of the local descriptor 350N from the local descriptor table 332 of FIG. 2A. However, the illustration is representative of other descriptors as well because they all have the same format. The descriptor 350N comprises a 32-bit base address (A0 . . . A31) 352N, a single-bit granularity indicator (G) 354N, a single-bit default operation size indicator (D) 356N, a single-bit segment present indicator (P) 358N, a 2-bit privilege level (PL0, PL1) 360N, a single-bit system descriptor indicator (S) 362N, a 4-bit descriptor type indicator (T0, T1, T2, T3) 364N, and a 20-bit segment limit (L0 . . . L19) 366N.

The value of the system descriptor indicator (S) 362N indicates whether the descriptor 350N is a system descriptor or a non-system descriptor. If the descriptor 350N is a system descriptor, the descriptor type indicator (T0 . . . T3) 364N indicates the particular type of the descriptor 350N according to Table 1.

TABLE 1

| DESCRIPTOR TYPE INDICATOR | | | | |
|---|---|---|---|---|
| T3 | T2 | T1 | T0 | DESCRIPTOR TYPE |
| 0 | 0 | 0 | 0 | Available 16-Bit TSS (Task State Segment) |
| 0 | 0 | 1 | 0 | Local Descriptor Table |
| 0 | 0 | 1 | 1 | Busy 16-Bit TSS |
| 0 | 1 | 0 | 0 | Call Gate |
| 0 | 1 | 0 | 1 | Task Gate |
| 0 | 1 | 1 | 0 | 16-Bit Interrupt Gate |
| 0 | 1 | 1 | 1 | 16-Bit Trap Gate |
| 1 | 0 | 0 | 0 | Reserved |
| 1 | 0 | 0 | 1 | Available 32-Bit CPU TSS |
| 1 | 0 | 1 | 0 | Reserved |
| 1 | 0 | 1 | 1 | Busy 32-Bit CPU TSS |
| 1 | 1 | 0 | 0 | 32-Bit CPU Call Gate |
| 1 | 1 | 0 | 1 | Reserved |
| 1 | 1 | 1 | 0 | 32-Bit CPU interrupt Gate |
| 1 | 1 | 1 | 1 | 32-Bit CPU Task Gate |

Thus, for example, when the system descriptor indicator (S) of the descriptor 340M of FIG. 2A indicates a system descriptor, and the type indicator is set to a hexadecimal value of 2 (0010), then the descriptor 340M identifies a local descriptor table.

On the other hand, if the descriptor 350N is a non-system descriptor, the descriptor type indicator 364N determines the particular type of the descriptor 350N, according to Table 2.

TABLE 2

| DESCRIPTOR TYPE INDICATOR | | | | |
|---|---|---|---|---|
| T3 | T2 | T1 | T0 | DESCRIPTOR TYPE |
| 0 | X | X | 0 | Data, Not Accessed |
| 0 | X | X | 1 | Data, Acceseed |
| 0 | X | 0 | X | Data, Not Writable |
| 0 | X | 1 | X | Data, Writable |
| 0 | 0 | X | X | Data, Expand Up |
| 0 | 1 | X | X | Data, Expand Down |
| 1 | X | X | 0 | Code, Not Accessed |
| 1 | X | X | 1 | Code, Acceseed |
| 1 | X | 0 | X | Code, Not Readable |
| 1 | X | 1 | X | Code, Readable |
| 1 | 0 | X | X | Code, Not Confirming |
| 1 | 1 | X | X | Code, Expand Confirming |

A number of the descriptors in both the global descriptor table 330 and the local descriptor table 332 identify memory segments in the user memory 500. For example, the local descriptor 350N has a base address (A0 . . . A31) 352N that identifies the beginning of the S2 memory segment 506 in the user memory 500. The segment limit (L0 . . . L19) 366N identifies the address offset between the beginning and the end of the S2 memory segment 506. The granularity indicator (G) 354N indicates the granularity (e.g., page granular or byte granular) of the segment limit 366N. The default operation size indicator (D) 356N is only recognized in code segment descriptors and indicates whether default operation size is on a word basis or a long word basis. The segment present indicator (P) 358N indicates whether the S2 memory segment 506 is present within the user memory 500. The privilege level (PL0, PL1) 360N indicates the privilege level of the memory segment 506. Privilege levels are described in greater detail below with reference to FIGS. 6, 7A, 7B, 8A, 8B and 9.

In the example of FIG. 2A, the descriptor 340B identifies the S5 memory segment 512; the descriptor 340C identifies the S4 memory segment 502; the descriptor 350C identifies the S1 memory segment 510; the descriptor 350E identifies the S0 memory segment 504; and the descriptor 350F identifies the S3 memory segment 508.

Figure 3A:
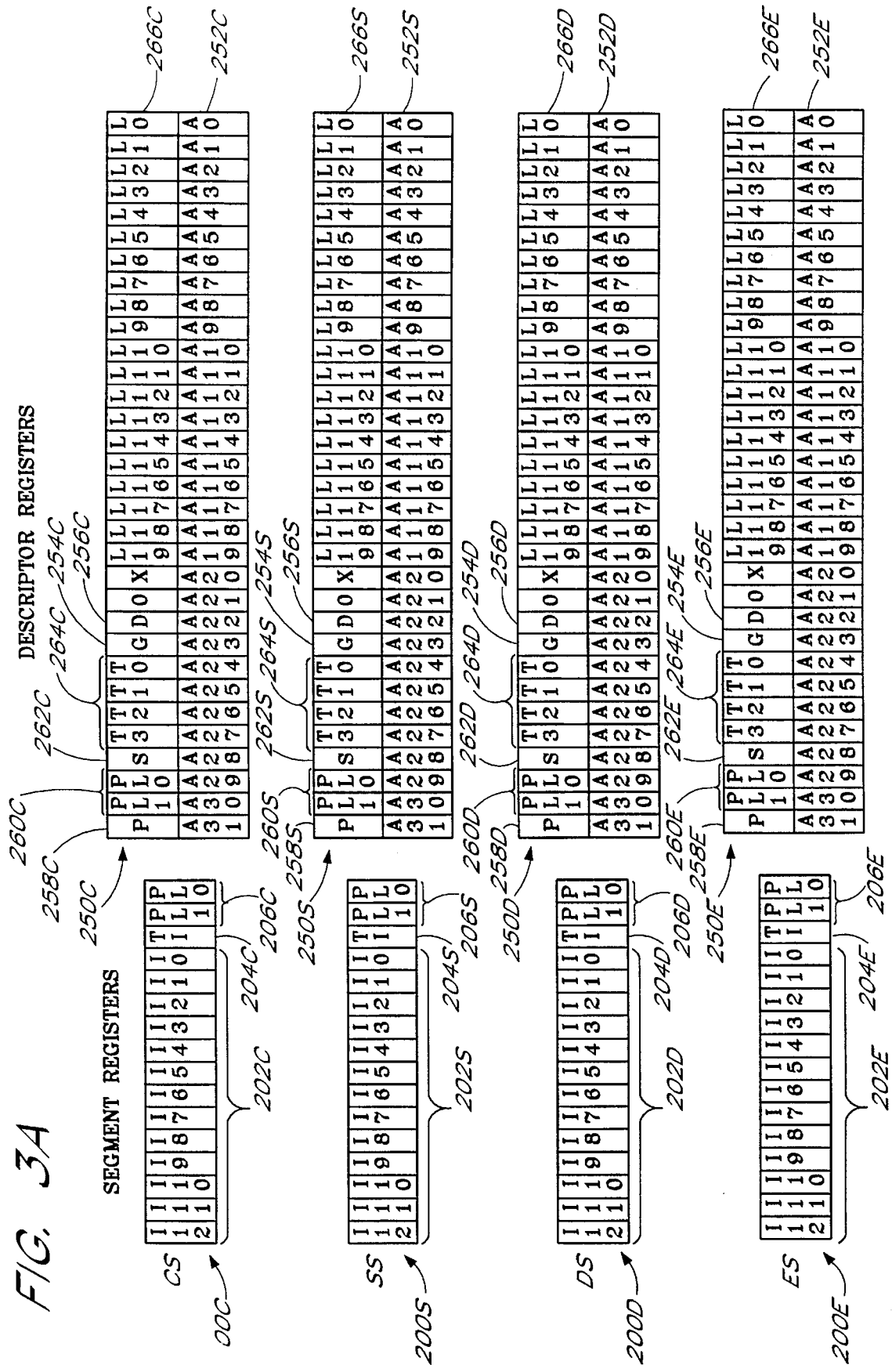
FIGS. 3A and 3B form a bit definition diagram of a set of six segment registers and six segment descriptor registers contained in a microprocessor of the preferred embodiment.
Figure 3B:
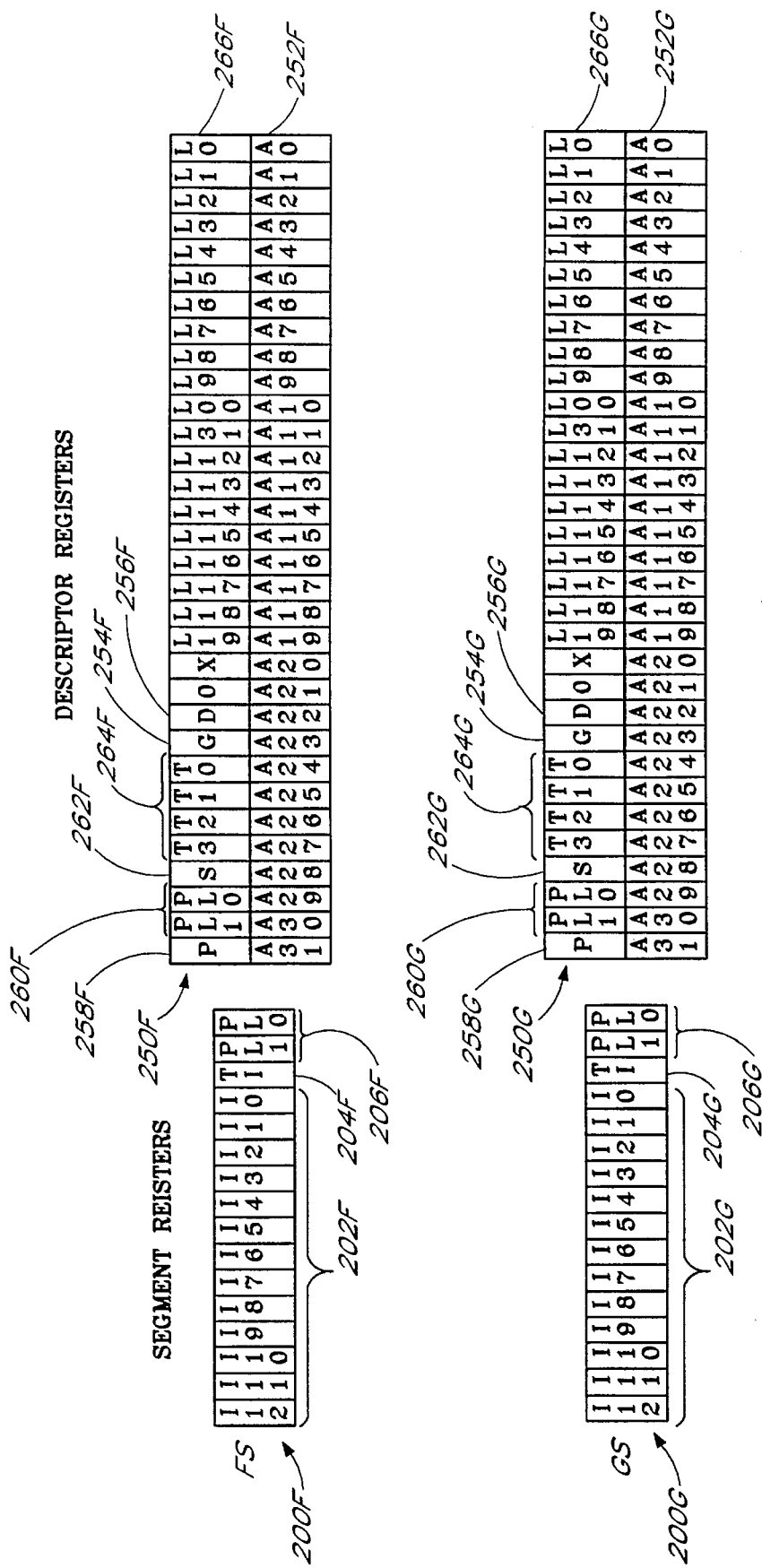

FIGS. 3A and 3B illustrate the bit format of a set of six segment registers, along with six corresponding segment descriptor registers of the preferred embodiment. The segment registers comprise a code segment register (CS) 200C, a stack segment register (SS) 200S, a data segment register (DS) 200D, an extended segment register (ES) 200E, a second data segment register FS 200F and a third data segment register (GS) 200G. The segment descriptor registers comprise a CS descriptor register 250C, an SS descriptor register 250S, a DS descriptor register 250D, an ES descriptor register 250E, an FS descriptor register 250F and a GS descriptor register 250G.

The segment registers 200C, 200S, 200D, 200E, 200F and 200G each comprise a 13-bit index 202C, 202S, 202D, 202E, 202F and 202G; a single-bit table indicator 204C, 204S, 204D, 204E, 204F and 204G; and a two-bit privilege level 206C, 206S, 206D, 206E, 206F and 206G.

The descriptor registers 250C, 250S, 250D, 250E, 250F and 250G each comprise a 32-bit base address 252C, 252S, 252D, 252E, 252F and 252G; a single-bit granularity indicator 254C, 254S, 254D, 254E, 254F and 254G; a single-bit default operation size indicator 256C, 256S, 256D, 256E, 256F and 256G; a single-bit segment present indicator 258C, 258S, 258D, 258E, 258F and 258G; a two-bit privilege level 260C, 260S, 260D, 260E, 260F and 260G; a single-bit system descriptor indicator 262C, 262S, 262D, 262E, 262F and 262G; a 4-bit type indicator 264C, 264S, 264D, 264E, 264F and 264G; and a 20-bit segment limit 266C, 266S, 266D, 266E, 266F and 266G. The elements of the descriptor registers 250C, 250S, 250D, 250E, 250F and 250G have the same functions as the corresponding elements of a descriptor, such as the descriptor 350N of FIGS. 2A and 2B. In fact, descriptors are generally loaded into the descriptor registers 250C, 250S, 250D, 250E, 250F and 250G.

Figure 4:
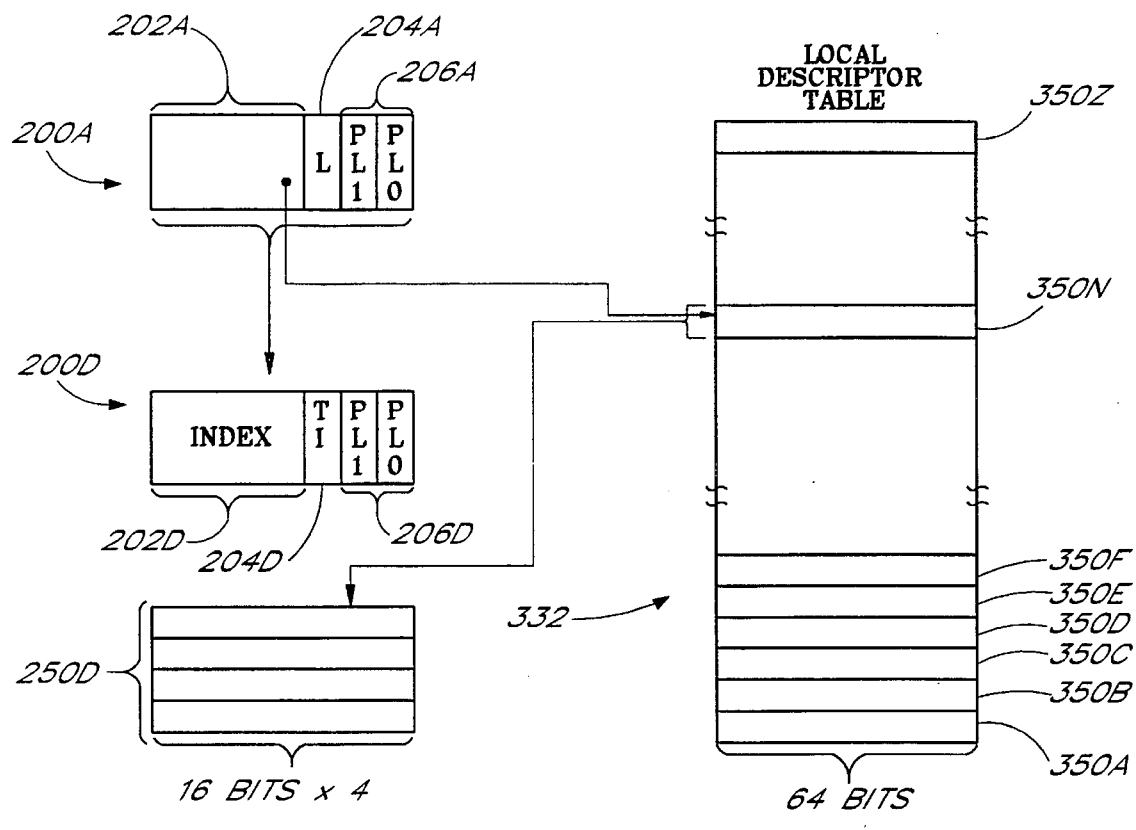
FIG. 4 is a functional diagram illustrating the loading of a selector into a segment register of FIG. 3A, and the loading of a descriptor table entry of FIGS. 2A and 2B into a segment descriptor register of FIG. 3A.

FIG. 4 illustrates a method of loading a 16-bit selector 200A into the DS register 200D of FIG. 3A. This method may be performed, for example, when executing an assembly language MOV (move data) instruction to transfer the selector 200A from a memory location to the DS register 200D. The selector 200A comprises a 13-bit index 202A, a single-bit table indicator 204A and a 2-bit privilege level 206A. The table indicator 204A indicates whether the operation involves the global descriptor table 330 (of FIG. 2A) or the local descriptor table 332. The index 202A identifies a specific descriptor within the appropriate descriptor table 330 or 332 in the same manner as the index 302 of FIG. 2A. In the example of FIG. 4, the table indicator 204A indicates that the load operation involves the local descriptor table 332, and the index 202A identifies the descriptor 350N. When an attempt is made to load the DS register 200D, the protection unit 180 determines whether the attempted register load violates a set of protection rules. This determination is described in greater detail below with reference to FIGS. 6, 7A, 7B, 8A, 8B, and 9. If there is no violation of the protection rules, the selector 200A is loaded into the DS register 200D. In addition, the microprocessor 100 automatically loads the contents of the descriptor entry 350N into the corresponding descriptor register 250D.

Figure 5:
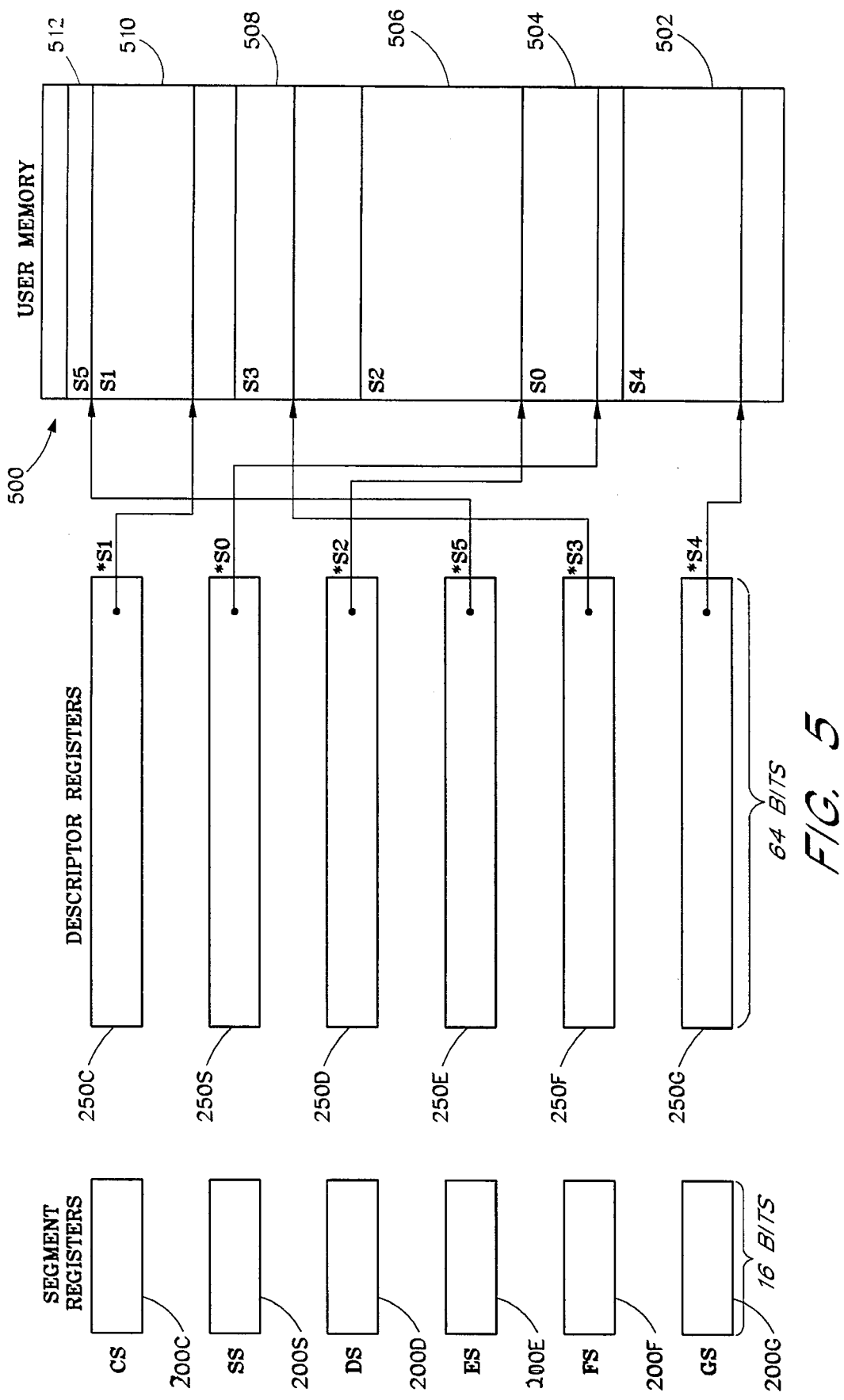
FIG. 5 is a functional block diagram illustrating a method of locating and identifying selected memory segments of FIG. 2A by using the segment registers of FIGS. 3A and 3B to identify desired descriptor table entries, which are loaded into the segment descriptor registers of FIGS. 3A and 3B.

FIG. 5 illustrates the use of the segment registers 200C, 200S, 200D, 200E, 200F, and 200G and the descriptor registers 250C, 250S, 250D, 250E, 250F, and 250G to address the different memory segments 502, 504, 506, 508, 510, and 512 of the user memory 500. Using a method that is similar to the method of FIG. 4, the segment registers 200S, 200D, 200E, 200F, and 200G are each loaded with an index 202S, 202D, 202E, 202F, and 202G, respectively, that identifies a particular descriptor in either the global descriptor table (FIG. 2A) or the local descriptor table 332 (FIGS. 2A and 4). The identified descriptors are loaded into the corresponding descriptor registers 250S, 250D, 250E, 250F and 250G. The descriptor registers 250S, 250D, 250E, 250F and 250G now identify different memory segments 502, 504, 506, 508, 510 and 512 of the user memory 500. The CS register 200C generally refers to the code segment that is currently executing. The SS register 200S generally refers to the current stack, and the segment registers 200D, 200E, 200F and 200G generally refer to data segments.

In the example of FIG. 5, the SS descriptor register 250S identifies the S0 memory segment 504; the DS descriptor register 250D identifies the S2 memory segment 506; the ES descriptor register 250E identifies the S5 memory segment 512; the FS descriptor register 250F identifies the S3 memory segment 508; and the GS descriptor register 250G identifies the S4 memory segment 502.

After the segment registers 200S, 200D, 200E, 200F, and 200G and the descriptor registers 250S, 250D, 250E, 250F, and 250G are loaded as illustrated in FIG. 5, a program may access one of the memory segments 502, 504, 506, 508, or 512 by referencing the corresponding segment register 200G, 200S, 200D, 200F, and 200E. For example, a program can access the memory segment 506 by referencing the DS register 200D, as is well-known to one of skill in the art.

The CS register 200C cannot be loaded by an MOV instruction. Instead, the contents of the CS register 200C are affected by executing control transfer instructions, such as JMP (jump), CALL (call procedure), RET (return from procedure), INT (software interrupt) and IRET (interrupt return). However, when a control transfer instruction causes the CS register 200C to be loaded, the CS descriptor register 250C is also automatically loaded, in a manner that is similar to the one described above, in connection with loading the other segment registers 200S, 200D, 200E, 200F and 200G. In the example of FIG. 5, the CS descriptor register 250C identifies the S1 memory segment 510.

There are a number of rules related to the type of descriptors that can be loaded into the different descriptor registers 250C, 250S, 250D, 250E, 250F and 250G. For example, a non-writable data segment descriptor cannot be loaded into the SS register 200S. These rules are described in greater detail below with reference to FIGS. 6, 7A, 7B, 8A, 8B and 9.

Figure 6:
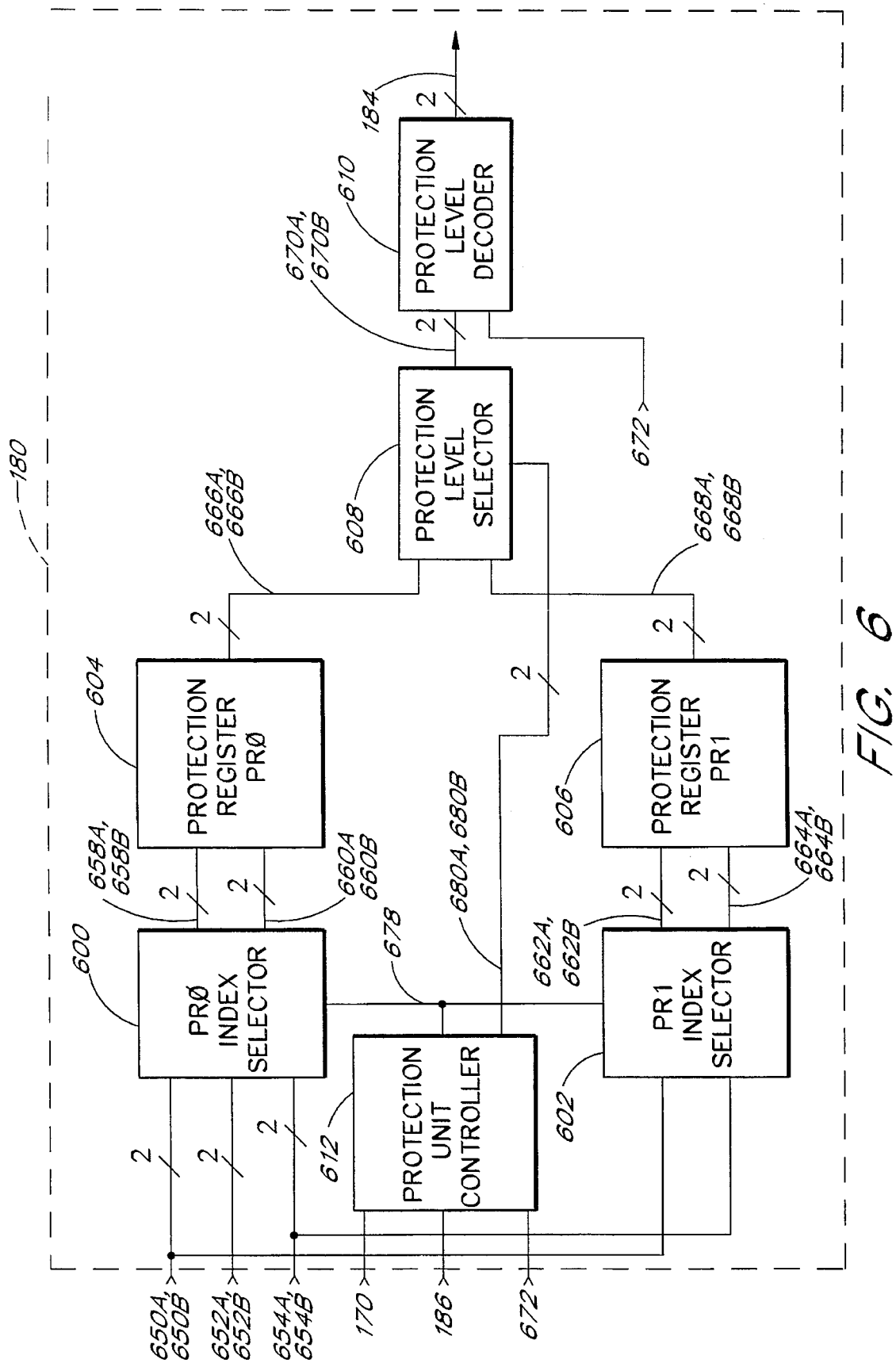
FIG. 6 is a functional block diagram of the protection unit of FIG. 1.

FIG. 6 is a partial functional block diagram of the protection unit 180 of FIG. 1. The protection unit 180 comprises a PR0 index selector 600, a PR1 index selector 602, a PR0 protection register 604, a PR1 protection register 606, a protection level selector 608, a protection level decoder 610 and a protection unit controller 612.

The PR0 index selector 600 receives signals from the execution unit 102 (FIG. 1) on a pair of DPL (data protection level) lines 650A and 650B, a pair of CPL (current protection level) lines 652A and 652B and a pair of RPL (requested protection level) lines 654A and 654B. The PR1 index selector 602 also receives signals from the execution unit 102 on the DPL lines 650A and 650B and the RPL lines 654A and 654B.

The protection unit controller 612 receives signals from the execution unit 102 on the segment type lines 672, from the micro-instruction register 164 on the micro-instruction bus 170, and from the decode unit 140 on the test qualifier lines 186. The signals on the segment type lines 672 correspond to the system descriptor indicator 362N and the descriptor type indicator 364N of FIG. 2B, and the signals indicate the type of segment descriptor that is involved in the validation test. The signals from the micro-instruction bus 170 indicate the validation test to be performed by the protection unit 180. The signals on the test qualifier lines 186 indicate the particular segment register that is involved in the validation test, as well as a set of protection test qualifiers. The protection test qualifiers comprise indications as to whether a JMP instruction is being executed, whether an IRET instruction is being executed, and whether the V86 (virtual 8086) mode is active.

The PRO index selector 600 and the PR1 index selector 602 also receive control signals from the protection unit controller 612 on the index select lines 678. The PRO index selector 600 is connected to the PRO protection register 604 by a pair of index0 lines 658A and 658B and a pair of index1 lines 660A and 660B. The PRO protection register 604 is connected to the protection level selector 608 by a pair of protection level lines 666A and 666B.

The PR1 index selector 602 is connected to the PR1 protection register 606 by a pair of index0 lines 662A and 662B and a pair of index1 lines 664A and 664B. The PR1 protection register 606 is connected to the protection level selector 608 by a pair of protection level lines 668A and 668B.

The protection level selector 608 also receives control signals from the protection unit controller 612 on the enable protection register lines 680A and 680B. The protection level selector 608 is connected to the protection level decoder 610 by a pair of protection level lines 670A and 670B. The protection level decoder 610 also receives the signals from the execution unit 102 (FIG. 1) on the segment type lines 672.

From a functional perspective, the protection level decoder 610 is connected to the micro-instruction ROM 156 (FIG. 1) by the pair of protection fault lines 184. The signals on the protection fault lines 184 function as the least significant address bits of the micro-instruction ROM 156 when a protection test is being performed. The structure and addressing of the micro-instruction ROM 156 are described in greater detail below with reference to FIG. 9.

The protection unit 180 can run a number of different validation tests. These tests comprise a Load Data Segment Register Test, a Verify Read/Write Test, a Load Access Rights Test, a Load Segment Limit Test, a Call Test, a Gate Test, an Interrupt Test, an Interrupt Return Test, and a CS Segment Register Test. The particular test performed by the protection unit 180 is controlled by the micro-instruction on the micro-instruction bus 170. Selected test bits from the micro-instruction are decoded by the protection unit controller 612, which controls the protection unit 180 to perform the appropriate validation test.

Generally, the Load Data Segment Register Test is performed when a MOV instruction attempts to load a selector into a data segment register 200D, 200E, 200F, or 200G (FIG. 3A and 3B). The Verify Read/Write Test is generally performed when a VERR (verify segment for read) instruction or a VERW (verify segment for write) instruction is executed. The Load Access Rights Test is generally performed when a LAR (load access rights) instruction is executed. The Load Segment Limit Test is generally performed when a LSL (load segment limit) instruction is executed. The Call Test is generally performed when a protected far CALL or JMP instruction is executed. The Gate Test is generally performed when a gate descriptor is encountered, such as during an interrupt or during execution of a far CALL or a far JMP instruction. The Interrupt Test and the Interrupt Return Test are generally performed in response to an external interrupt. The CS Segment Register Test is generally performed when an IRET instruction or a far RET instruction is executed. Other tests may also be performed by the protection unit 180 under the control of the micro-instructions. However, these tests are preferably performed by hardwired circuitry, and not by the circuitry represented in FIG. 6.

The signals on the segment type lines 672 correspond to the system descriptor indicator 362N and the descriptor type indicator 364N of FIG. 2B, and the signals indicate the type of segment descriptor that is involved in the validation test. The signals from the micro-instruction bus 170 indicate the validation test to be performed by the protection unit 180. The signals on the test qualifier lines 186 indicate the particular segment register 200C, 200S, 200D, 200E, 200F, or 200G that is involved in the validation test, as well as the protection test qualifiers.

The signals on the DPL lines 650A and 650B indicate the privilege level (DPL) of the descriptor involved in the validation test. In the example of FIG. 4, the DPL is the privilege level of the descriptor 350N that is identified by the index 202A of the selector 200A. Specifically, the DPL is the privilege level 360N (FIG. 2B). The signals on the CPL lines 652A and 652B indicate the privilege level (CPL) of the software routine that is executing when the validation test is initiated. In the example of FIG. 4, the CPL is the privilege level of the routine that executes the MOV instruction that attempts to load the DS register 200D. The CPL of the routine that is currently executing is placed in the CS register 200C by the operating system when the routine begins execution. The operating system obtains this privilege level from the descriptor that identifies the memory segment containing the routine. Thus, the CPL, for the example of FIG. 4, is the privilege level 206C of the CS register 200C (FIG. 3A). The signals on the RPL lines 654A and 654B indicate the privilege level (RPL) of the software routine that requested the operation that resulted in the validation test. In the example of FIG. 4, the RPL represents the privilege level of the routine that requested that the MOV instruction be executed. Normally, the routine executing an instruction is the same as the routine requesting that the instruction be executed, and so the RPL is the same as the CPL. However, one routine may request that another routine execute an instruction. For example, a first routine may pass an operand containing a selector 200A to a second routine and request that the second routine access data in a memory segment identified by the selector 200A. Before accessing the data, the second routine must first load the selector 200A into a data segment register 200D, 200E, 200F, or 200G. The RPL is obtained from the privilege level specified in the operand containing the selector 200A. Thus, the RPL, for the example of FIG. 4, is the privilege level 206A of the selector 200A.

Figure 7A:
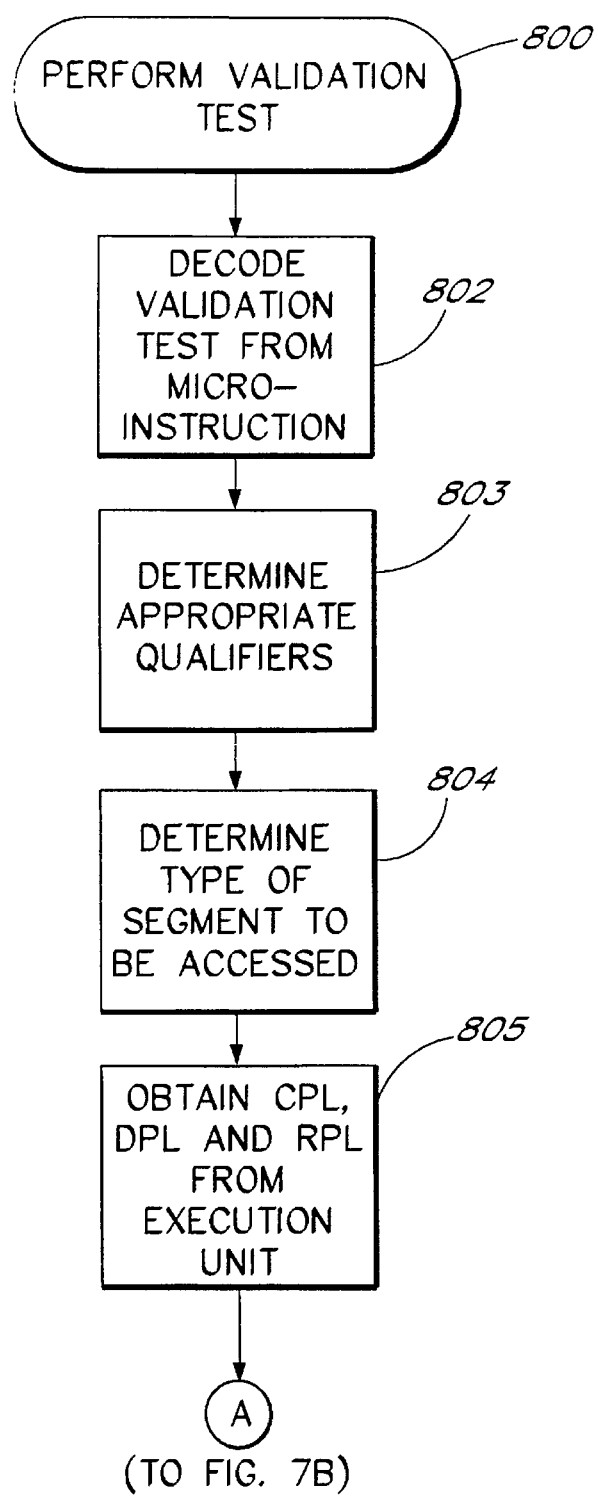
FIGS. 7A and 7B form a logical flow chart illustrating a general method of detecting a memory segment violation using the protection unit of FIGS. 1 and 6.
Figure 7B:
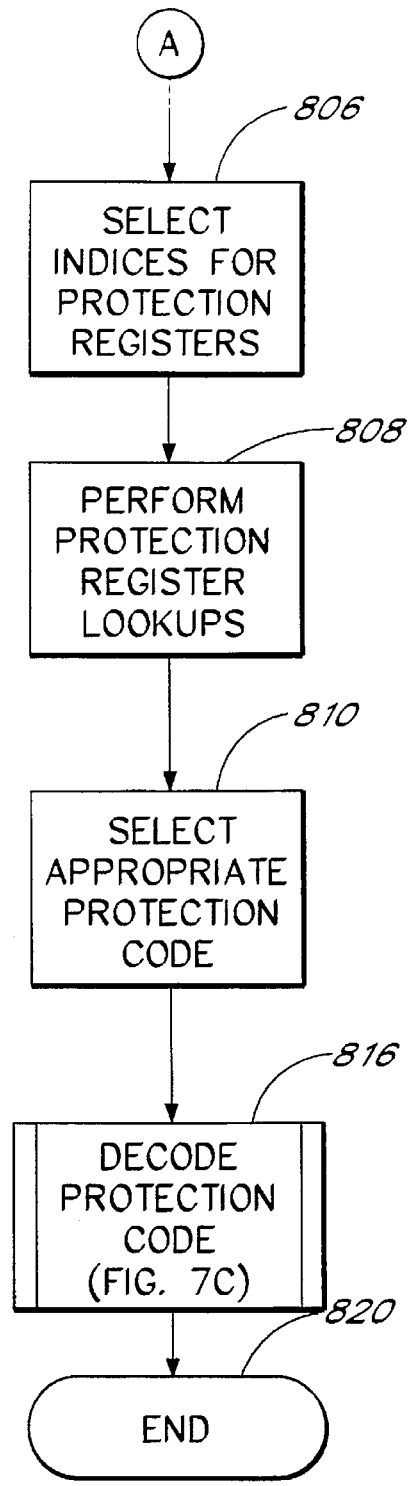

FIGS. 7A, 7B and 7C form a logical flow chart illustrating the operation of the protection unit 180 of FIG. 6. (Although the logical flow charts of FIGS. 7A, 7B, 7C, and 8 have the appearance of program flow charts, it should be understood that many of the decisions and processes occur simultaneously in the processes represented by the logical flow charts rather than in sequence.)

The method begins at a block 800. At a process block 802, the protection unit controller 612 determines the type of protection test to be performed, based on the test bits from the micro-instruction, received on the micro-instruction bus 170.

At a process block 803, the protection unit controller 612 determines which segment register 200C, 200S, 200D, 200E, 200F, or 200G is involved in the validation test, as well as the status of the protection test qualifiers. These determinations are based upon the signals on the test qualifier lines 186.

At a process block 804, the protection unit controller 612 and the protection level decoder 610 each determine the type of descriptor that is involved in the validation test. These determinations are based on the segment type lines 672 received from the execution unit 102 (FIG. 1).

At a process block 805, the protection unit 180 obtains the DPL, the CPL, and the RPL from the execution unit 102 (FIG. 1) on the DPL lines 650A and 650B, the CPL lines 652A and 652B, and the RPL lines 654A and 654B, respectively.

At a process block 806, shown in FIG. 7B, the protection unit controller 612 generates control signals on the index select lines 678 to control the index selectors 600 and 602. The index selectors 600 and 602, as controlled by the protection unit controller 612, constitute protection register controllers. Of the three sets of input signals, DPL, CPL and RPL, the PR0 index selector 600 applies one set to the index0 lines 658A and 658B and another set to the index1 lines 660A and 660B. The set of input signals applied to each set of output lines 658A, 658B and 660A, 660B depends on the validation test being executed, the type of descriptor involved, the segment register 200C, 200S, 200D, 200E, 200F or 200G involved, and the protection test qualifiers. The different combinations of input signals selected by the PR0 index selector 600 are indicated in Table 3. For example, for a Load Data Segment Register Test, the signals on the DPL lines 650A and 650B are transferred to the index0 lines 658A and 658B, while the signals on the CPL lines 652A and 652B are transferred to the index1 lines 660A and 660B. Similarly, the PR1 index selector 602 transfers signals from the DPL lines 650A and 650B and the RPL lines 654A and 654B to the index0 lines 662A and 662B and the index1 lines 664A and 664B. The different combinations of input signals selected by the PR1 index selector 602 are also indicated in Table 3. For example, for a Load Data Segment Register Test, the PR1 index selector 602 transfers the signals from the DPL lines 650A and 650B to the index0 lines 662A and 662B, and it transfers the signals from the RPL lines 654A and 654B to the index1 lines 664A and 664B. Protection tests for situations that are not represented in Table 3, such as a Gate Test involving a JMP instruction and a nonconforming code descriptor, are preferably performed by hardwired circuitry. In Table 3, "Sys." indicates that the test involves a system descriptor; "Data" indicates that the test involves a data descriptor; "Nonconf. Code" indicates that the test involves a nonconforming code descriptor; "Conf. Code" indicates that the test involves a conforming code descriptor; "Code" (by itself) indicates that the test involves either a nonconforming code descriptor or a conforming code descriptor; "X" indicates that the index selected is not relevant (i.e., a don't care situation); and "Gate—JMP instr." indicates that the test is a Gate test that resulted from executing a JMP instruction.

TABLE 3

| PROTECTION TEST | PR0 INDEX0 | PR0 INDEX1 | PR1 INDEX0 | PR1 INDEX1 |
|---|---|---|---|---|
| Ld. Data Seg. Reg. (Sys., Data, Nonconf. Code) | DPL | CPL | DPL | RPL |
| Verify - (Sys., Data, Nonconf. Code) | DPL | CPL | DPL | RPL |
| Ld. Access Rts. - (Sys., Data, Nonconf. Code) | DPL | CPL | DPL | RPL |
| Ld. Seg. Lim. - (Sys., Data, Nonconf. Code) | DPL | CPL | DPL | RPL |
| Call - (Sys.) | DPL | CPL | DPL | RPL |
| Call - (Nonconf. Code) | X | X | DPL | RPL |
| Call - (Conf. Code) | CPL | DPL | X | X |
| Gate (Sys., Data, Code) | CPL | DPL | X | X |
| Gate - JMP Instr. (Conf. Code) | CPL | DPL | X | X |
| Interrupt - (Sys., Data, Code) | DPL | CPL | X | X |
| CS (Nonconf. Code) | RPL | CPL | X | X |
| CS (Conf. Code) | X | X | RPL | DPL |

At a process block 808, the protection registers 604 and 600 generate protection level values on the protection level lines 666A, 666B and 668A, 668B, respectively, based on the values of the indices received on the index0 lines 658A, 658B and 662A, 662B, and the index lines 660A, 660B and 664A, 664B. The PR0 protection register 604 and the PR1 protection register 606 are programmable look-up tables. Each register 604 and 606 can be programmed independently by executing predefined micro-instructions. Based on the values on the index0 lines 658A and 658B and the index lines 660A and 660B, the protection register 604 generates a preprogrammed protection level on the protection lines 666A and 666B. Similarly, the protection register 606 generates preprogrammed protection levels on the protection level lines 668A and 668B based on values on the index0 lines 662A and 662B and the index lines 664A and 664B. The programming of the protection registers 604 and 606 substantially determine the protection rules that are implemented by the protection unit 180. Table 4 indicates the output signals generated by each of the protection registers 604 and 606 for the possible index values for a preferred embodiment of the present invention. Downloading the protection registers 604 and 606 according to Table 4 causes each of the protection registers 604 and 606 to implement the following rules:

(1) If index1='00' then generate a protection level of '11'; else (2) If index1 <=index0, then generate a protection level of '10'; else (3) If index1=index0 +1, then generate a protection level of '01'; else (4) Generate a protection level of '00'.

The values in Table 4 can be readily changed so that the protection registers 604 and 606 output different protection levels in response to the index values. Thus, by reprogramming the protection registers with different output values for the possible index values, the protection rules can be changed without requiring any changes in the protection hardware.

TABLE 4

| INDEX0:INDEX1 | PR0 | PR1 |
| --- | --- | --- |
| 00:00 | 11 | 11 |
| 00:01 | 01 | 01 |
| 00:10 | 00 | 00 |
| 00:11 | 00 | 00 |
| 01:00 | 11 | 11 |
| 01:01 | 10 | 10 |
| 01:10 | 01 | 01 |
| 01:11 | 00 | 00 |
| 10:00 | 11 | 11 |
| 10:01 | 10 | 10 |
| 10:10 | 10 | 10 |
| 10:11 | 01 | 01 |
| 11:00 | 11 | 11 |
| 11:01 | 10 | 10 |
| 11:10 | 10 | 10 |
| 11:11 | 10 | 10 |

At a process block 810, the protection level selector 608 selects a protection code from either the protection level lines 666A and 666B or the protection level lines 668A and 668B. The selection of a protection code is based on the protection check being performed, the type of descriptor involved, the protection test qualifiers, and a comparison of the value represented on the protection level lines 666A and 666B and the value represented on the protection level lines 668A and 668B. The protection code selected by the protection level selector 608 may be any one of three possibilities: (1) the minimum of the two protection levels, (2) the protection level generated by the PR0 protection register 604, or (3) the protection level generated by the PR1 protection register 606. Table 5 indicates the selection made under various circumstances. The abbreviations in Table 5 correspond to the abbreviations in Table 3. The selected privilege code is applied to the protection level lines 670A and 670B.

TABLE 5

| PROTECTION TEST | PROTECTION LEVEL |
| --- | --- |
| Ld. Data Seg. Reg. (Sys., Data, Nonconf. Code) | Minimum |
| Verify - (Sys., Data, Nonconf. Code) | Minimum |
| Ld. Access Rts. - (Sys., Data, Nonconf. Code) | Minimum |
| Ld. Seg. Lim. - (Sys., Data, Nonconf. Code) | Minimum |
| Call - (Sys.) | Minimum |
| Call - (Nonconf. Code) | PR1 |
| Call - (Conf. Code) | PR0 |
| Gate (Sys., Data, Code) | PR0 |
| Gate - JMP Instr. (Conf. Code) | PR0 |
| Interrupt - (Sys., Data, Code) | PR0 |
| CS (Nonconf. Code) | PR0 |
| CS (Conf. Code) | PR1 |

At a process block 816, the protection level decoder 610 determines the result of the test, based on the protection code received from the protection level selector 608 and the type of segment to be accessed, as determined at the process block 804. FIG. 7C is a more detailed logical flow chart illustrating the process implemented at the process block 816. FIG. 7C is described below.

Referring to the process block 816, if the received protection code is 0, the protection level decoder 610 generates a protection fault, regardless of any other circumstances. If the received protection code is 1 and the type of segment to be accessed is a code segment, a writable data segment or a system segment, the protection level decoder 610 generates a protection fault. Otherwise, the protection level decoder 610 indicates that there is no protection fault. If the received protection code is 2 and the type of segment to be accessed is a nonreadable code segment or a system segment, the protection level decoder 610 generates a protection fault. Otherwise, the protection level decoder 610 indicates that there is no protection fault. If the received protection code is 3 and the type of segment to be accessed is a nonreadable code segment or an LDT (local descriptor table) or a non-busy TSS system segment, the protection level decoder 610 generates a protection fault. Otherwise, the protection level decoder 610 indicates that there is no protection fault.

The foregoing rules can be summarized as follows. One of the following outcomes is selected in accordance with the protection code received from the protection level selector 608:

| Protection Code | Outcome |
| --- | --- |
| 00 | Always generate protection fault. |
| 01 | Generate protection fault if: (1) Code segment access; (2) Data segment access and segment writable; (3) System segment access. |
| 10 | Generate protection fault if: (1) Code segment access and segment not readable; (2) System segment access. |
| 11 | Generate protection fault if: (1) Code segment access and segment not readable; (2) System segment access and not a segment for LDT or non-busy TSS. |

The protection level decoder 610 generates signals on the protection fault lines 184 to indicate the test results. Depending on the particular test being executed, the possible test results may comprise: test failed, test passed, wrong type/bad priority, segment not present, good segment—set accessed bit, good segment—don't set accessed bit, Not TSS/TSS Busy bit Not set/TSS in LDT, good task state segment, good task gate, and good trap gate or interrupt gate. The effect of the signals on the protection fault lines 184 is described in greater detail below with reference to FIG. 9. At a terminal block 820, the process of FIGS. 7A and 7B for performing a validation test is complete.

As indicated above, FIG. 7C is a more detailed logical flow chart of the method implemented at the process block 816. The method of decoding the protection codes received from the protection level selector 608 begins at an initial block 700.

At a decision block 702, the method branches to one of four locations depending on the value of the two-bit protection code received from the protection level selector 608. If the received protection code has a value of '11', the method continues at a decision block 710. If the received protection code has a value of '10', the method continues at a decision block 726. If the received protection code has a value of '01', the method continues at a decision block 728. If the received protection code has a value of '00', the method continues at a process block 732.

At the decision block 710, the protection unit 180 determines the type of memory segment that is referenced by the selector that is to be loaded into the data segment register 200D, 200E, 200F or 200G. This is determined by checking the system descriptor indicator and the type indicator of the descriptor identified by the selector that is to be loaded into the data segment register 200D, 200E, 200F or 200G. If the segment descriptor is a system descriptor, the protection unit 180 advances to a decision block 712. If the segment descriptor is a data descriptor, the protection unit 180 advances to a process block 718. If the segment descriptor is a code descriptor, the protection unit 180 advances to a decision block 722.

At the decision block 712, the protection unit 180 determines if the system descriptor is a local descriptor table (LDT) type descriptor. The types of system descriptors are illustrated above with reference to Table 1. If the system descriptor is an LDT, the protection unit 180 advances to the process block 718. Otherwise, the protection unit 180 advances to a decision block 714.

At the decision block 714, the protection unit 180 determines whether the system descriptor is a non-busy task state segment (TSS) type descriptor. If so, the protection unit 180 advances to the process block 718. Otherwise, the protection unit 180 advances to a process block 716.

At the process block 716, the protection unit 180 generates a protection fault on the protection fault lines 184. After the process block 716, the protection unit 180 advances to a terminal block 720.

At the process block 718, the protection unit 180 indicates on the protection fault lines 184 that there is no protection fault. After the process block 718, the protection unit 180 advances to the terminal block 720.

At the decision block 722, the protection unit 180 determines whether the code segment descriptor indicates that the code segment is readable. If so, the protection unit 180 advances to the process block 718. Otherwise, the protection unit 180 advances to a process block 724.

At the process block 724, the protection unit 180 indicates a protection fault on the protection fault lines 184. After the process block 724, the protection unit 180 advances to the terminal block 720.

At the decision block 726, the protection unit 180 determines the type of memory segment that is referenced by the selector that is to be loaded into the data segment register 200D, 200E, 200F or 200G. If the segment descriptor is a code descriptor, the protection unit 180 advances to the decision block 722. If the segment descriptor is a system descriptor, the protection unit 180 advances to the decision block 724. If the segment descriptor is a data descriptor, the protection unit 180 advances to the process block 718.

At the decision block 728, the protection unit 180 determines whether the segment descriptor identified by the selector is a data descriptor. If so, the protection unit 180 advances to a decision block 730. Otherwise, the protection unit 180 advances to the process block 732.

At the decision block 730, the protection unit 180 determines whether the data descriptor indicates that the memory segment is readable. If so, the protection unit 180 advances to the process block 732. Otherwise, the protection unit 180 advances to the process block 718.

At the process block 732, the protection unit 180 indicates a protection fault on the protection fault lines 184. After the process block 732, the protection unit 180 advances to the terminal block 720. At the terminal block 720, the protection unit 180 completes the process of the process block 816 (FIG. 7B).

Figure 8:
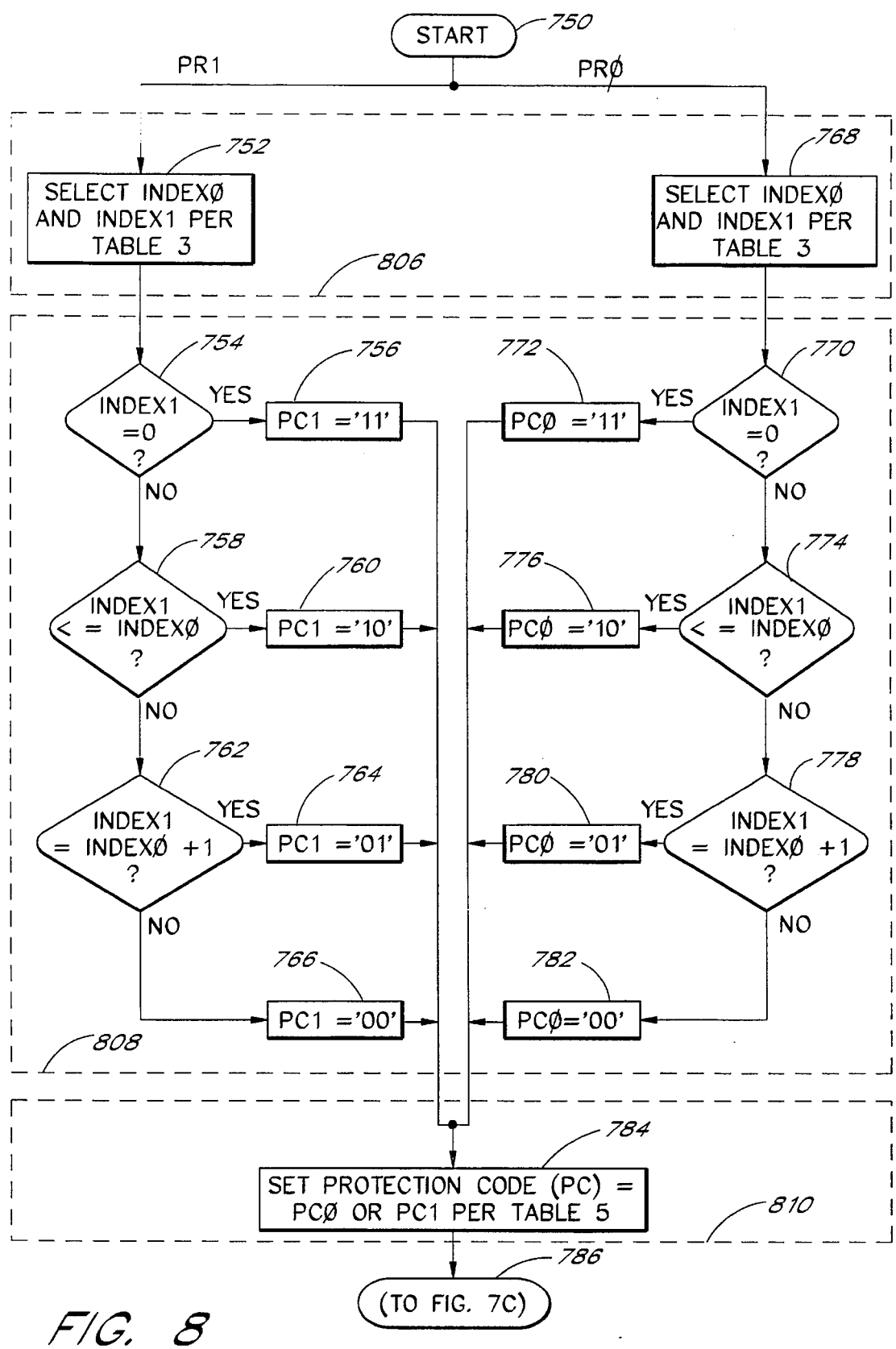
FIG. 8 is a logical flow chart illustrating a preferred method for generating protection codes that may be implemented at a set of three process blocks 806, 808 and 810 of FIG. 7B.
Figure 8A:
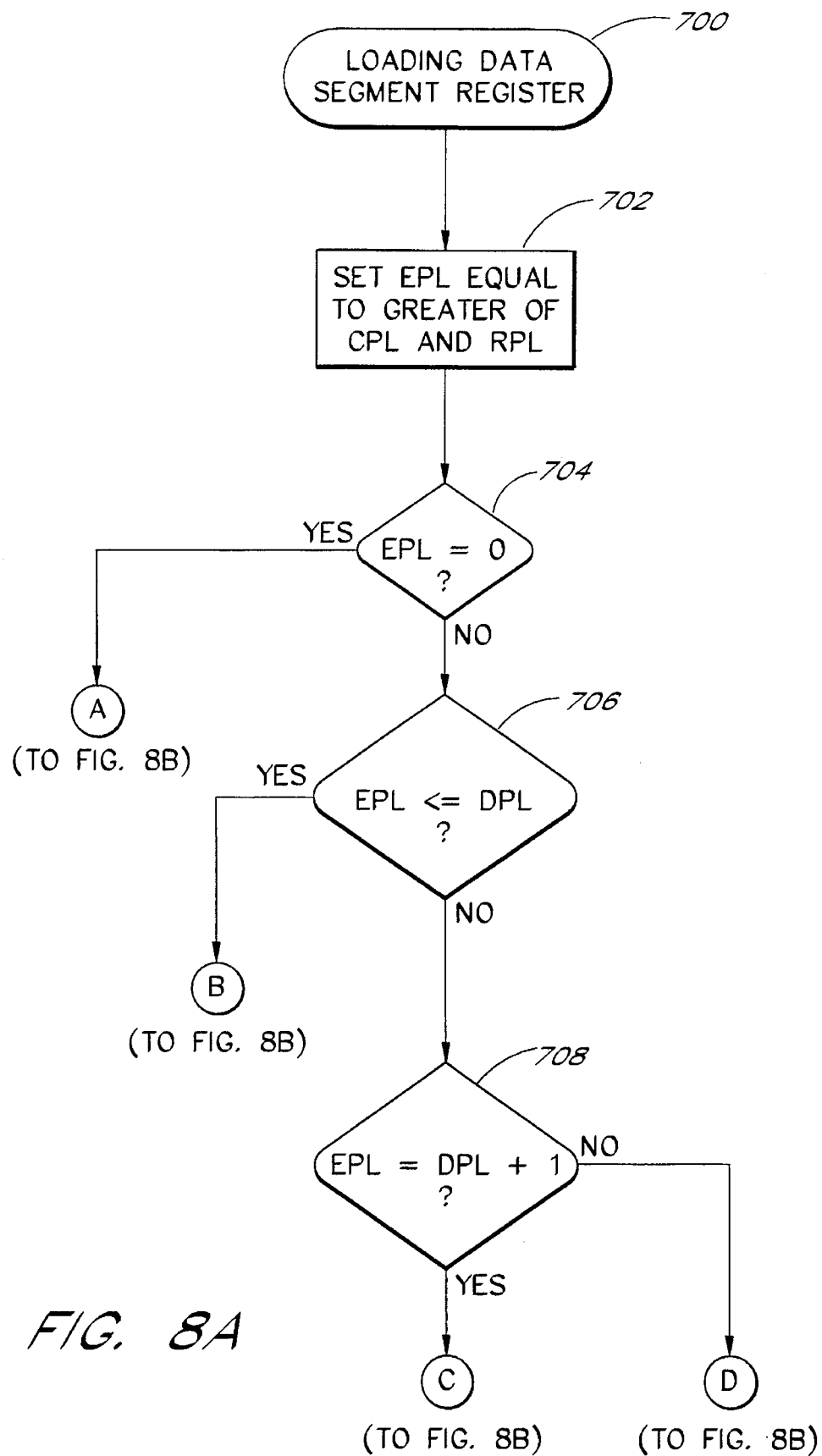

FIG. 8 is a more detailed logical flow chart of the preferred processes implemented at the process blocks 806, 808 and 810 of FIG. 7B. The method illustrated in FIG. 8 corresponds to the preferred embodiment, in which the protection registers 604 and 606 are downloaded with the data illustrated in Table 4. The process block 806 of FIG. 7B corresponds to a pair of process blocks 752 and 768 of FIG. 8. The process block 808 of FIG. 7B corresponds to a set of six decision blocks 754, 758, 762, 770, 774, and 778 and a set of eight process blocks 756, 760, 764, 766, 772, 776, 780, and 782 of FIG. 8. The process block 810 of FIG. 7B corresponds to a process block 784 of FIG. 8. For this description of the method of FIG. 8, the terms "greater than" and "less than", when used in connection with index1 and index0 relate to the numerical values of index1 and index0.

The method of FIG. 8 begins at an initial block 750. From the initial block 750, the method branches into two parallel paths of execution. For a first execution path the method continues at the process block 752. For a second execution path the method continues at the process block 768.

Referring first to the first execution path, at the process block 752, the PR1 index selector 602 selects an index0 and an index1 according to Table 3. Thus, for a Load Data Segment Register Test involving a system, data, or nonconforming code descriptor, the PR1 index selector 602 selects the DPL value as index0 and the RPL value as index1.

At the decision block 754, the PR1 protection register 606 determines whether index is equal to zero. If index1 is equal to zero, the method advances to the process block 756. Otherwise, the method advances to the decision block 758.

At the decision block 758, the PR1 protection register 606 determines whether index1 is less than or equal to index0. If index is less than or equal to index0, the method advances to the process block 760. Otherwise, the method advances to the decision block 762.

At the decision block 762, the PR1 protection register 606 determines whether index1 is equal to index0 plus one. If so, the method advances to the process block 764. Otherwise, the method advances to the process block 766.

At the process block 756, the PR1 protection register 606 generates a PR1 protection code (PC1) of '11'. After the process block 756, the method advances to the process block 784.

At the process block 760, the PR1 protection register 606 generates a PR1 protection code (PC1) of '10'. After the process block 760, the method advances to the process block 784.

At the process block 764, the PR1 protection register 606 generates a PR1 protection code (PC1) of '01'. After the process block 764, the method advances to the process block 784.

At the process block 766, the PR1 protection register 606 generates a PR1 protection code (PC1) of '00'. After the process block 766, the method advances to the process block 784.

Referring now to the second execution path, at the process block 768, the PR0 index selector 600 selects an index0 and an index1 according to Table 3. Thus, for a Load Data Segment Register Test involving a system, data, or nonconforming code descriptor, the PR0 index selector 600 selects the DPL value as index0 and the CPL value as index1.

At the decision block 770, the PR0 protection register 604 determines whether index is equal to zero. If index1 is equal to zero, the method advances to the process block 772. Otherwise, the method advances to the decision block 774.

At the decision block 774, the PR0 protection register 604 determines whether index1 is less than or equal to index0. If index is less than or equal to index0, the method advances to the process block 776. Otherwise, the method advances to the decision block 778.

At the decision block 778, the PR0 protection register 986 determines whether index is equal to index0 plus one. If so, the method advances to the process block 780. Otherwise, the method advances to the process block 782.

At the process block 772, the PR0 protection register 604 generates a PR0 protection code (PC0) of '11'. After the process block 772, the method advances to the process block 784.

At the process block 776, the PR0 protection register 604 generates a PR0 protection code (PC0) of '10'. After the process block 776, the method advances to the process block 784.

At the process block 780, the PR0 protection register generates a PR0 protection code (PC0) of '01'. After the process block 780, the method advances to the process block 784.

At the process block 782, the PR0 protection register 604 generates a PR0 protection code (PC0) of '00'. After the process block 782, the method advances to the process block 784.

The two execution paths converge at the process block 784. At the process block 784, the protection level selector 608 selects either the PR1 protection code PC1 or the PR0 protection code PC0 according to Table 5. The protection level selector 608 sets a protection code (PC) equal to the selected code. Thus, for a Load Data Segment Register Test involving a system, data, or nonconforming code descriptor, the protection level selector 608 sets the protection code (PC) equal to the lesser of the PR1 protection code PC1 and the PR0 protection code PC0. After the process block 784, the method terminates at a terminal block 786.

In combination, FIGS. 8 and 7C illustrate a preferred method for detecting memory segment violations that is performed by the protection unit 180 of the present invention. This preferred method corresponds to the preferred download data of Table 4 for the protection registers 604 and 606.

In combination, the decision blocks 754, 758, 762, 770, 774, and 778 and the process blocks 756, 760, 764, 766, 772, 776, 780, and 782 implement a set of protection rules that are determined by the data programmed into the protection registers 604 and 606. The function of this portion of the method of FIG. 8 can be modified in many different ways by modifying the data in the protection registers 604 and 606. Thus, the present invention provides for programmable protection rules. For example, one rule implemented in the method of FIGS. 8 and 7C is that an LDT descriptor or a non-busy TSS descriptor can be loaded into a segment register 200D, 200E, 200F or 200G if both CPL and RPL equal 0. Another rule implemented in the method of FIGS. 8 and 7C is that a read-only data segment can be accessed by a software routine that has a numeric privilege level that is no more than one greater than the numeric privilege level of the data segment (i.e., the software routine is only one level less privileged than the data segment).

Providing programmable protection rules allows a system-level programmer to customize the protection mechanism of the computer system to the requirements of the particular system design. Thus, a system having particularly sensitive data or having a large number of application programs may be implemented with a relatively strict protection mechanism. Also, providing programmable protection rules allows a system-level programmer to modify the protection mechanism of an existing system to account for changes in the operating environment that may require either stricter or less strict protection rules.

The following description of a hypothetical sequence of operations executed within a computer system having a protection mechanism of the present invention further explains the function of the protection mechanism. The following description examines the operation of the protection mechanism only in relation to attempts at loading a data segment register 200D, 200E, 200F or 200G. In this description, comparisons of the privileges CPL, DPL and RPL refer to their numeric values. A first program task TSK3 has a privilege level of 3, while a second program task TSK2 has a privilege level of 2. Also, a first data segment D3 has a privilege level of 3, while a second data segment D2 has a privilege level of 2. Initially, the task TSK3 is executing. The CS register 200C contains a table indicator 204C and an index 202C pointing to the code segment containing TSK3, as well as a CPL 206C that indicates a privilege level of 3.

TSK3 attempts to load the DS register 200D with a selector containing a table indicator and an index value pointing to D3, and a privilege level of 0. The CPL is equal to the privilege level of TSK3 (a privilege level of 3), as indicated by the privilege level 206C of the CS register 200C. The RPL is equal to the privilege level indicated by the selector that TSK3 is attempting to load into the DS register 200D (a privilege level of 0). The DPL is equal to the privilege level of the data segment D3 (a privilege level of 3), as indicated in the corresponding segment descriptor. The table indicator and the index of the selector that TSK3 is attempting to load into the DS register 200D point to the segment descriptor that corresponds to the data segment D3. For this operation, there is no segment violation because the CPL is less than or equal to the DPL of D3, and the RPL is less than or equal to the DPL of D3. The segment register load is allowed.

Next, TSK3 attempts to load the ES register 200E with a selector containing a table indicator and an index value pointing to D2, and with a privilege level of 2. A segment violation occurs because the CPL is equal to 3, while the DPL of D2 is equal to 2. The segment register load is not allowed.

Next, TSK3 calls TSK2. TSK3 passes a selector to TSK2 that contains a table indicator and an index pointing to D2, and a privilege level of 2; and TSK3 requests that TSK2 access the data segment D2 using the selector provided. The CS register 200C is loaded with a table indicator and an index pointing to the code segment containing TSK2, and with a CPL of 2.

If TSK2 immediately loads the provided selector into a data segment register 200D, 200E, 200F or 200G, there is no violation detected because CPL is equal to 2, RPL (from the provided selector) is equal to 2, and DPL is equal to 2. However, this access should not be allowed because this would allow a privilege level 3 task (TSK3) to have access to a privilege level 2 data segment (D2), through a privilege level 2 task (TSK2). To avoid this situation, TSK2 should use the ARPL (adjust requested privilege level) instruction to adjust the RPL of the provided selector to the privilege level of TSK3. Now, if TSK2 attempts to load the provided selector into a data segment register 200D, 200E, 200F or 200G, there is a violation because RPL is equal to 3, while DPL is equal to 2.

Next, TSK2 attempts to load the ES register 200E with a selector containing a table indicator and an index pointing to D2, and a privilege level of 0. The CPL is equal to the privilege level of TSK2 (a privilege level of 2), as indicated by the privilege level 206C of the CS register 200C. The RPL is equal to the privilege level indicated by the selector that TSK2 is attempting to load into the ES register 200E (a privilege level of 0). The DPL is equal to the privilege level of the data segment D2 (a privilege level of 2). There is no segment violation because the CPL is equal to the DPL of D2 and RPL is equal to 0. The segment register load is allowed. TSK2 can now access the data segment D2 using the ES register 200E, as long as there are no memory read/write violations. TSK2 can also access the data segment D3 using the DS register 200D, as long as there are no memory read/write violations.

Next, TSK2 returns execution to TSK3. During execution of the RET instruction, the processor checks the DPLs of the memory segments to which the data segment registers 200D, 200E, 200F and 200G point. If any of the DPLs is less than the CPL of TSK3, the corresponding data segment register 200D, 200E, 200F or 200G is loaded with the null selector. In this scenario, the ES register 200E points to data segment D2, which has a DPL of 2. This DPL is less than the CPL of TSK3. Consequently, the ES register 200E is loaded with the null selector. Next, the processor loads the CS register 200C with a selector that contains a table and an index that point to the code segment containing the task TSK3, and a CPL of 3.

Figure 9:
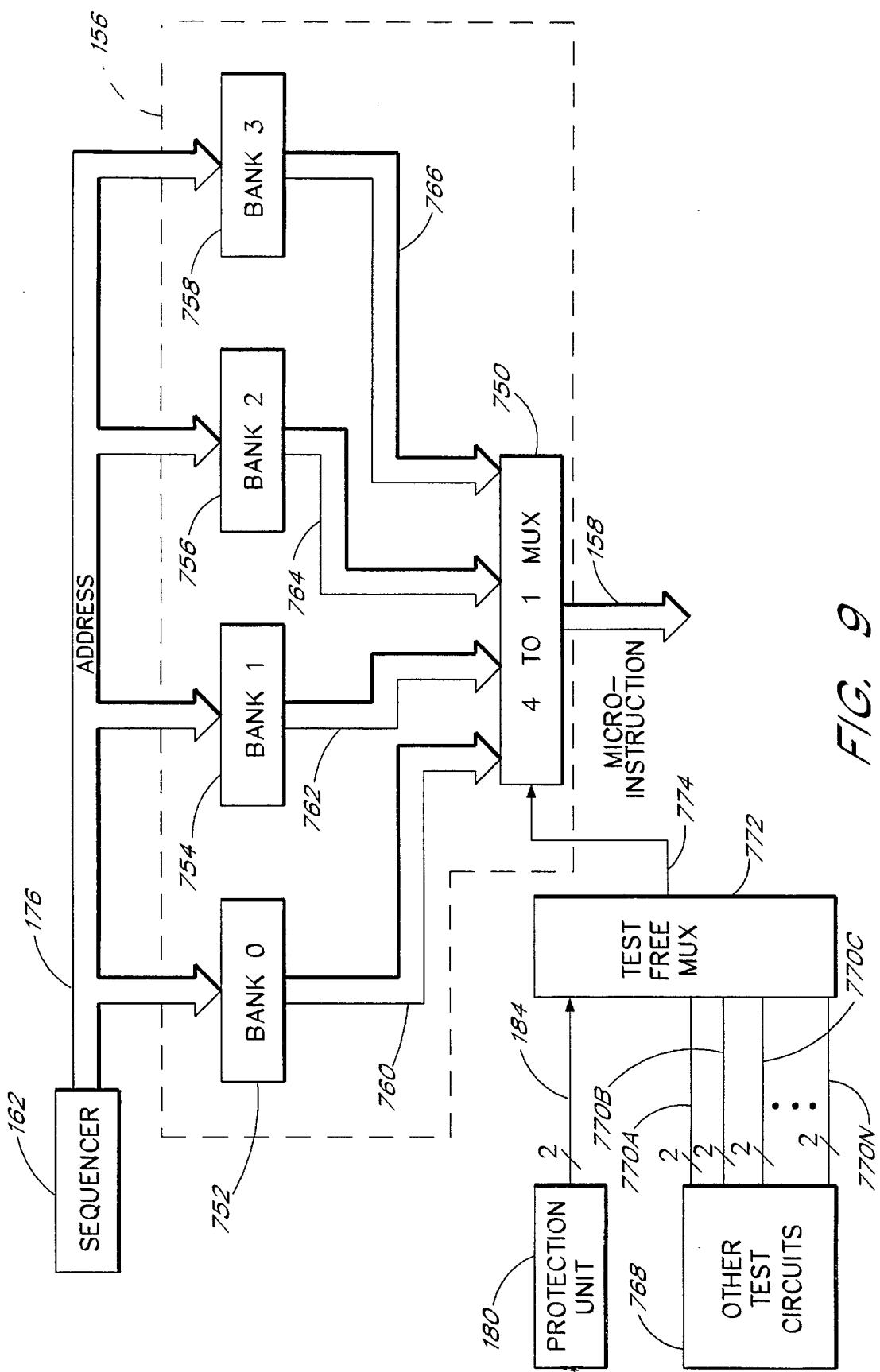
FIG. 9 is a functional block diagram of a preferred design for obtaining desired micro-instructions from the micro-instruction ROM of FIG. 1 using test result outputs from the protection unit of FIGS. 1 and 6.

FIG. 9 illustrates a preferred mechanism for addressing the micro-instruction ROM 156 to obtain desired micro-instructions. FIG. 9 illustrates the sequencer 162, the micro-instruction ROM 156, the protection unit 180, a set of other test circuits 768, and a test tree multiplexer 772. The micro-instruction ROM 156 is divided into four banks, a bank0 752, a bank1 754, a bank2 756 and a bank3 758. The micro-instruction ROM 156 also comprises a 4-to-1 multiplexer 750. The sequencer 162 is connected to each of the banks 752, 754, 756 and 758 of the micro-instruction ROM 156 by the address/control bus 176. Bank0 752 is connected to the multiplexer 750 by a micro-instruction bus 760. The bank1 754 is connected to the multiplexer 750 by a micro-instruction bus 762. The bank2 756 is connected to the multiplexer 750 by a micro-instruction bus 764. The bank3 758 is connected to the multiplexer 750 by a micro-instruction bus 766. The protection unit 180 is connected to the test tree multiplexer 772 by the protection fault lines 184. The other test circuits 768 are connected to the test tree multiplexer 772 by a set of test fault lines 770A to 770N. The test tree multiplexer 772 is connected to the multiplexer 750 by a pair of test fault lines 774. The multiplexer 750 is connected to the multiplexer 150 (FIG. 1) by the micro-instruction bus 158.

The sequencer 162 generates an address on the address/control bus 176 to select a micro-instruction from each of the banks 752, 754, 756, and 758. In the preferred embodiment, the micro-instruction ROM 156 has a configuration of 2K by 96 bits. Each of the banks 752, 754, 756, and 758 has a configuration of 512×96 bits. Thus, the sequencer 162 provides 9 address bits to each of the banks 752, 754, 756, and 758 to select a single micro-instruction from each bank. The test fault lines 774 control the multiplexer 750 to select one of the four micro-instructions from the micro-instruction buses 760, 762, 764, and 766. Thus, the signals on the test fault lines 774 function in the same manner as address bits to the entire micro-instruction ROM 156, and the signals affect the sequence of execution of the micro-instructions in the micro-instruction ROM 156. The micro-instructions in the ROM 156 are interleaved between the banks 752, 754, 756 and 758 so that the test fault lines 774 effectively function as the two least significant address bits of the ROM 156. The signals on the test fault lines 774 indicate whether a fault has occurred, and if so, which type of fault has occurred. Thus, depending on the type of fault, if any, the microprocessor 100 executes different micro-instructions from the ROM 156.

The test tree multiplexer 774 enables any one set of input signals from either the protection fault lines 184 or one of the other sets of test fault lines 770A to 770N to control the multiplexer 750, depending on the type of test that is being executed. Thus, when a protection test is being performed, the signals on the protection fault lines 184 control the multiplexer 750 to select a micro-instruction from the micro-instruction buses 760, 762, 764 and 766.

A system programmer can use the protection mechanism of the present invention by assigning privilege levels to all descriptors, as is well known in the art. Also, the protection registers 604 and 606 can be downloaded by micro-instructions to implement desired protection rules. Preferably, the protection registers 604 and 606 are initially loaded with the values illustrated in Table 4 during the manufacturing and testing process. Finally, the micro-instruction ROM 156 can be programmed to execute desired protection tests, and error routines can be programmed into the micro-instructions to handle protection faults, as desired. The error routines must be located in the micro-instruction ROM 156 so that the protection unit 180 causes the appropriate error routine to execute by selecting the appropriate micro-instruction from the ROM 156, depending on the type of protection fault detected. The remainder of the protection mechanism operates automatically.

Various embodiments of the present invention have been described above. Although this invention has been described with reference to these specific embodiments, the descriptions are intended to be illustrative of the invention and are not intended to be limiting. Various modifications and applications may occur to those skilled in the art without departing from the true spirit and scope of the invention as defined in the appended claims.

What is claimed is:

1. A memory control unit for a microprocessor that can run multiple tasks, said memory control unit having segment registers for directing memory access requests to specified segments in a memory associated with said memory control unit, said memory control unit further assigning privilege levels to said segments in said memory and assigning privilege levels to said multiple tasks, said memory control unit comprising:

a protection circuit that monitors privilege levels of tasks and privilege levels of said specified segments in said memory, said protection circuit verifying that a task requesting a specified memory segment has a task privilege level which permits said task to access said specified memory segment; and at least one programmable protection register accessible by said protection circuit, said programmable protection register receiving as inputs said task privilege level of said task requesting said specified memory segment and a privilege level of said specified memory segment, said protection register combining said inputs and outputting at least one value that indicates whether access to said memory segment by said task is permitted, said protection circuit permitting said memory control unit to load a segment register with a value which selects said specified memory segment only when access to said specified memory segment by said task is permitted, said programmable protection register being reprogrammable to change said at least one value output by said protection register when said inputs remain the same.

2. A memory protection unit for detecting memory access violations within a microprocessor, said microprocessor having access to a memory, said microprocessor defining a plurality of memory segments in said memory, each of said memory segments having a privilege level associated therewith, said microprocessor executing an active software routine, said active software routine also having a privilege level associated therewith, said active software routine attempting to access a memory location in one of said memory segments, said memory protection unit comprising:

a protection register controller for selecting one of a plurality of index values, said protection register controller determining the respective privilege levels of said active software routine and said one memory segment and selecting one of said plurality of index values in response thereto; and a programmable protection register, said protection register storing a first plurality of programmed protection level values selected by said plurality of index values, said protection register receiving said selected index value from said protection register controller, said protection register generating the programmed protection level value selected by said selected index value, said protection level value indicating whether a memory access violation has occurred, said programmable protection register being reprogrammable with a second plurality of programmed protection level values, said second plurality of programmed protection level values changing when said protection level value indicates that a memory access violation has occurred.

3. The memory protection unit as defined in claim 2, wherein each of said memory segments has a segment type associated therewith, wherein said protection register controller determines the segment type of said one memory segment, and wherein the selection of one of said plurality of index values by said protection register controller is further controlled by said segment type of said one memory segment.

4. The memory protection unit as defined in claim 2, wherein said memory protection unit can execute any one of a plurality of memory access tests under microprogram control, wherein said protection register controller decodes microprogram instructions to determine which memory access test to execute, and wherein the selection of one of said plurality of index values by said protection register controller is further controlled by the selected memory access test.

5. The memory protection unit as defined in claim 2, wherein said microprocessor comprises a plurality of segment registers for storing a plurality of segment values, said plurality of segment values identifying a plurality of said memory segments, wherein said attempted access of said memory location requires a first segment value to be loaded into one of said plurality of segment registers, said first segment value identifying said one memory segment, said memory access test being executed when said first segment value is loaded into said one segment register.

6. The memory protection unit as defined in claim 2, wherein each of said segment registers has a segment register type associated therewith, wherein said protection register controller determines the segment register type of said one segment register, and wherein the selection of one of said plurality of possible index values by said protection register controller is further controlled by the segment register type of said one segment register.

7. The memory protection unit as defined in claim 2, wherein said active software routine attempts said access of said memory location in response to a request by a requesting software routine, said requesting software routine also having a privilege level associated therewith, wherein said protection register controller determines the privilege level of said requesting software routine, and wherein the selection of one of said plurality of possible index values by said protection register controller is further controlled by said privilege level of said requesting software routine.

8. The memory protection unit as defined in claim 2, wherein said programmable protection register is initially programmed to allow a memory access to a local descriptor table type system segment or a non-busy task state segment type system segment if said privilege level of said software routine indicates that said software routine is more privileged than a predetermined level.

9. The memory protection unit as defined in claim 2, wherein said programmable protection register is initially programmed to allow a memory access to a read only data segment if said privilege level of said software routine is within one of the privilege level of said read only data segment.

10. The memory control unit as defined in claim 1, wherein, if a specifying task specifies a memory segment to be accessed by a requesting task and said requesting task requests said memory segment specified by said specifying task, said protection circuit additionally verifies that said specifying task is also privileged to access said specified memory segment and said set of privilege levels that are combined to form said inputs to said programmable protection register additionally comprises a privilege level of said task specifying said memory segment.

11. A method of detecting memory access violations within a microprocessor, said microprocessor having access to a memory, said microprocessor defining a plurality of memory segments in said memory, each of said memory segments having a privilege level associated therewith, said memory containing a plurality of software routines, each of said software routines also having a privilege level associated therewith, said method comprising the steps of:

programming a programmable protection register with a set of programmed protection level values, said set of programmed protection values indexed by a plurality of index values, said set of programmable protection level values being reprogrammable to change a set of conditions which cause memory access violations within said microprocessor;

determining the privilege level of a software routine attempting a memory access;

determining the privilege level of the memory segment to which said memory access is directed;

selecting one of said plurality of index values in response to said privilege level of said software routine attempting said memory access and in response to said privilege level of said memory segment to which said memory access is directed;

applying said selected index value to a programmable protection register to generate a programmed protection level value corresponding to said selected index value; and generating a protection validation response code in response to said protection level value, said protection validation response code indicating whether a memory access violation has occurred.

12. The method as defined in claim 11, wherein any of a plurality of validation tests can be performed to detect memory access violations, and wherein said method additionally comprises a step of determining which validation test to run.

13. The method as defined in claim 11, wherein each of said memory segments has a segment type associated therewith, wherein said method additionally comprises a step of determining the type of memory segment to which said memory access is directed, wherein said step of selecting one of a plurality of index values is additionally responsive to the type of said memory segment to which said memory access is directed, and wherein said step of generating a protection validation response code is additionally responsive to the type of said memory segment to which said memory access is directed.

* * * * *